US007747718B2

(12) United States Patent
Shirane et al.

(10) Patent No.: US 7,747,718 B2
(45) Date of Patent: Jun. 29, 2010

(54) CONTROL SYSTEM APPARATUS, METHOD FOR SETTING CONTROL SYSTEM AND SETTING PROGRAM

(75) Inventors: Kakuto Shirane, Mishima (JP); Shinji Fukui, Mishima (JP)

(73) Assignee: Omron Corporation, Kyoto (JP)

( * ) Notice: Subject to any disclaimer, the term of this patent is extended or adjusted under 35 U.S.C. 154(b) by 1266 days.

(21) Appl. No.: 10/969,239

(22) Filed: Oct. 21, 2004

(65) Prior Publication Data

US 2005/0144271 A1 Jun. 30, 2005

(30) Foreign Application Priority Data

| | | | |
|---|---|---|---|
| Oct. 22, 2003 | (JP) | ............................ | 2003-362594 |
| Apr. 13, 2004 | (JP) | ............................ | 2004-118426 |
| Oct. 14, 2004 | (JP) | ............................ | 2004-299916 |

(51) Int. Cl.
*G06F 15/173* (2006.01)

(52) U.S. Cl. ...................................................... 709/223

(58) Field of Classification Search ................. 709/220, 709/223–224, 230; 715/734, 735, 736, 737
See application file for complete search history.

(56) References Cited

U.S. PATENT DOCUMENTS

| | | | | |
|---|---|---|---|---|
| RE36,444 | E * | 12/1999 | Sanchez-Frank et al. | 715/839 |
| 6,134,580 | A * | 10/2000 | Tahara et al. | 709/202 |
| 6,212,559 | B1 * | 4/2001 | Bixler et al. | 709/221 |
| 6,229,540 | B1 * | 5/2001 | Tonelli et al. | 715/735 |
| 6,243,747 | B1 * | 6/2001 | Lewis et al. | 709/220 |
| 6,247,049 | B1 * | 6/2001 | Scott | 709/222 |
| 6,546,419 | B1 * | 4/2003 | Humpleman et al. | 709/223 |
| 6,567,849 | B2 * | 5/2003 | Ludovici et al. | 709/223 |
| 6,631,128 | B1 * | 10/2003 | Lemieux | 370/351 |
| 6,772,204 | B1 * | 8/2004 | Hansen | 709/220 |
| 6,970,919 | B1 * | 11/2005 | Doi et al. | 709/220 |

(Continued)

FOREIGN PATENT DOCUMENTS

| | | |
|---|---|---|
| JP | 11-103309 | 4/1999 |

(Continued)

OTHER PUBLICATIONS

DeviceNet Configurator Ver.2 Operation Manual and English version thereof (Front page, Table of Contents & Sec. 4—relevant parts only) pp. 61-106.

*Primary Examiner*—J Bret Dennison
(74) *Attorney, Agent, or Firm*—Foley & Lardner LLP

(57) ABSTRACT

The control system setting apparatus is composed of a computer, comprising a processor, storage device, input device, display, and an interface connectable to a control system. The storage device stores therein a setting program 30 and a setting data 40. Component profile data is stored in a CPS 43 of the setting data 40. The component profile data is prepared for each component. The setting program makes the processor execute the following processes: When the input device is operated to select a network and a component to be used, a network constitution editor 33 checks for adaptability between the network and the component based on the component profile data. On condition that the component is adaptable to the network intended to connect the component, a network block diagram is created using a network icon to show the selected network and a component icon to show the selected component, and then displayed on the display.

20 Claims, 38 Drawing Sheets

U.S. PATENT DOCUMENTS

| | | | | |
|---|---|---|---|---|
| 7,013,331 | B2 * | 3/2006 | Das | 709/220 |
| 7,093,005 | B2 * | 8/2006 | Patterson | 709/220 |
| 7,120,680 | B1 * | 10/2006 | Higgins et al. | 709/220 |
| 7,188,159 | B2 * | 3/2007 | Ralston et al. | 709/220 |
| 7,191,236 | B2 * | 3/2007 | Simpson-Young et al. | 709/228 |
| 7,206,825 | B1 * | 4/2007 | Sauriol et al. | 709/220 |
| 7,315,985 | B1 * | 1/2008 | Gauvin et al. | 715/734 |
| 2002/0035625 | A1 * | 3/2002 | Tanaka | 709/223 |
| 2002/0147809 | A1 * | 10/2002 | Vinberg | 709/224 |
| 2003/0200287 | A1 * | 10/2003 | Vasamsetti et al. | 709/220 |
| 2004/0252694 | A1 * | 12/2004 | Adhikari et al. | 370/395.2 |
| 2004/0267922 | A1 * | 12/2004 | Rover et al. | 709/223 |
| 2005/0044502 | A1 * | 2/2005 | Fu | 715/734 |
| 2005/0055641 | A1 * | 3/2005 | Machida | 715/734 |
| 2005/0081157 | A1 * | 4/2005 | Clark et al. | 715/736 |
| 2007/0011194 | A1 * | 1/2007 | Gurevich | 707/103 Y |

FOREIGN PATENT DOCUMENTS

| | | |
|---|---|---|
| JP | 2001-53763 A | 2/2001 |
| JP | 2003-076405 | 3/2003 |
| JP | 2003-177978 | 6/2003 |
| JP | 2003-288458 | 10/2003 |

* cited by examiner

Fig. 6

<Cps>
± <Component >
± <Parameters>
± <Enums>
±<Groups>
± <ImageFile>
±<ExchangeableComObject >
± <AddOnFunctions >
</Cps>

Fig. 7

```
<Cps FormatRevision="1.0" Revision="1" Type="CPS1" DefType="Component" Comment="">
  <Component ModelName="CS1W-SCU21-V1" VenderName="OMR Corporation“
  MajorVer="1" MinorVer="2" CompoType="PLCUnit" EquipmentType=“BuildingBlock”
  CategoryType=“Communications Adapter” ProductName=“Serial communication unit   ”>
    (Omitted)
 </Component>
 <Parameters>
    (Omitted)
 </Parameters>
 <Enums>
    (Omitted)
 </Enums>
 <Groups>
    (Omitted)
 </Groups>
 <ExchangableComObject>
    (Omitted)
 </ExchangableComObject>
 <AddOnFunctions>
    (Omitted)
 </AddOnFunctions>
</Cps>
```

Fig. 8

```
<Component ModelName="CS1W-AD041" VenderName="OMR Corporation"
 MajorVer="1" MinorVer="0" CompoType="PLCUnit" EquipmentType="BuildingBlock"
 CategoryType="General Purpose Analog I/O" ProductName=" Analog input unit (4 units)">
 <CompoNotificationInfo SourceData="ReadControllerInfo" DestinationData="CS1W-AD041" />
 <BuildingBlockInfo RepresentCompo="No">
   <PLCUnitInfo Series="CS" UnitType="SIOU_IOUnit">
     <EnableBasePosition Position="All" />
     <OccupySlots Number="1" />
     <SIOUIOUnitInfo MaxUnitNumber="95" NumOfOccupyUnitNum="1" />
   </PLCUnitInfo>
 </BuildingBlockInfo>
</Component>
```

Fig. 9

```
<Component ModelName="CS1M-CPU13" VenderName="OMR Corporation" MajorVer="1"
MinorVer="0" CompoType="PLCUnit" EquipmentType="BuildingBlock" CategoryType="PLC"
ProductName=" CPU unit ">
  <Communication>
    <CommIF Name="F_01" PhysicalPortType="Peripheral" MachineNumberingType="PeripheralOfPLC">
      <AttachableNetworkName Name="N_01" NetworkName="GeneralSerial" />
      <AttachableNetworkName Name="N_02" NetworkName="CompowayF">
        <NetworkSubType Name="O_01" Type="Master" />
      </AttachableNetworkName>
    </CommIF>
    <CommIF Name="F_02" PhysicalPortType="HostLink" MachineNumberingType="HostLinkOfPLC">
      <AttachableNetworkName Name="N_03" NetworkName="GeneralSerial" />
      <AttachableNetworkName Name="N_04" NetworkName="CompowayF">
        <NetworkSubType Name="O_02" Type="Master" />
      </AttachableNetworkName>
    </CommIF>
  </Communication>
  <CompoNotificationInfo SourceData="UnitProfile_CPU" DestinationData="0x801E" />
  <CXServerDeviceInfo DeviceName="CJ1M" CPUType="CPU13" />
  <BuildingBlockInfo RepresentCompo="Yes">
    <PLCUnitInfo Series="CJ" UnitType="CPUUnit">
      <OccupySlots Number="1" />
      <CPUUnitInfo MaxNumOfBaseUnits="2" MaxNumOfTotalIOBits="960" GatewayNumber="0" />
    </PLCUnitInfo>
  </BuildingBlockInfo>
</Component>
```

Fig. 10

```
<Parameters>
 <Parameter Name="P_Input1InputSignalUseSetting" ManName=" Input No.1 use setting "
  AreaType="SIOU_DMArea" Offset="+0" StartBit="0" BinBCD="Bin" DataSize="1bit" Min="0" Max="1"
  InitData="0" ScalingMultipler="1" ScalingDevider="1" ScalingOffset="0" Unit="No" Disp="Yes"
  DispForm="List" DecimalPlace="0" ZeroSuppression="0" EnumName="E_InputSignal"
  ParamRefForEnum="No" SetGet="SetGet" ResetInfo="Restart" Help="" />
 <Parameter Name="P_Input2InputSignalUseSetting" ManName=" Input No.2 use setting "
  AreaType="SIOU_DMArea" Offset="+0" StartBit="1" BinBCD="Bin" DataSize="1bit" Min="0" Max="1"
  InitData="0" ScalingMultipler="1" ScalingDevider="1" ScalingOffset="0" Unit="No" Disp="Yes"
  DispForm="List" DecimalPlace="0" ZeroSuppression="0" EnumName="E_InputSignal"
  ParamRefForEnum="No" SetGet="SetGet" ResetInfo="Restart" Help="" />
</Parameters>
```

Fig. 11

```
<ImageFile Icon="Icon_CS1W-AD041.ico" />
```

Fig. 12

```
<AddOnFunctions>
  <Application SSName="CX-Protocol" />
</AddOnFunctions>
```

Fig. 13

```
<Cps FormatRevision="1.0" Revision="1" Type="CPS1" DefType="Network" Comment="">
  <Network NetworkName="CompowayF" MinNetworkNumber="0" MaxNetworkNumber="0"
  MinNodeNumber="0" MaxNodeNumber="62">
    <MasterAndSlave NumberOfMasters="1" />
  </Network>
  <Manual FileName="" />
</Cps>
```

Fig. 14

```
<Cps FormatRevision="1.0" Revision="1" Type="CPS1" DefType="Network" Comment="">
 <Network NetworkName="ControllerLink" MinNetworkNumber="0" MaxNetworkNumber="127"
 MinNodeNumber="1" MaxNodeNumber="62" />
 <Parameters>
  <Parameter Name="MaximumNodeAddress" ManName="Maximum node address" AreaType="FINS_0201_0A05"
  Offset="+0" StartBit="0" BinBCD="Bin" DataSize="8bit" Min="2" Max="32" InitData="32"
  ScalingMultipler="1" ScalingDevider="1" ScalingOffset="0" Unit="No" Disp="Yes"
  DispForm="Base10Unsigned" DecimalPlace="0" ZeroSuppression="0" EnumName="No"
  ParamRefForEnum="No" SetGet="SetGet" ResetInfo="Write" Help="" />
  <Parameter Name="NumOfPolledNodesPerCommCycle" ManName="Number of polled nodes"
  AreaType="FINS_0201_0A05" Offset="+1" StartBit="8" BinBCD="Bin" DataSize="8bit" Min="1"
  Max="31" InitData="4" ScalingMultipler="1" ScalingDevider="1" ScalingOffset="0" Unit="No"
  Disp="Yes" DispForm="Base10Unsigned" DecimalPlace="0" ZeroSuppression="0" EnumName="No"
  ParamRefForEnum="No" SetGet="SetGet" ResetInfo="Write" Help="" />
  <Parameter Name="NumOfEventFramesPerCommCycle" ManName=" Number of event frames "
  AreaType="FINS_0201_0A05" Offset="+1" StartBit="0" BinBCD="Bin" DataSize="8bit" Min="6"
  Max="238" InitData="35" ScalingMultipler="1" ScalingDevider="1" ScalingOffset="0" Unit="No"
  Disp="Yes" DispForm="Base10Unsigned" DecimalPlace="0" ZeroSuppression="0" EnumName="No"
  ParamRefForEnum="No" SetGet="SetGet" ResetInfo="Write" Help="" />
 </Parameters>
 <Groups>
  <Group Name="G_All" DispName=" All parameters " />
 </Groups>
 <Manual FileName="" />
</Cps>
```

Fig. 24

| Component ID | Component type | Component Version | Setting tool ID | Drawing file name | Drawing size |
|---|---|---|---|---|---|
| 001 | CS1H-CPU67H | 001 | 001 | OM_CS1H_CPU67H. PNG | length:20, width:10 |
| 002 | CS1H-CPU66H | 001 | 001 | OM_CS1H_CPU66H. PNG | length:20, width:10 |

Fig. 25

| Type-ID | Component type | Setting tool ID | Drawing file name |
|---|---|---|---|
| 1138 | NODE-PLC | NONE | OM_NODE_PLC_.PNG |
| 6234 | NETWORK | 005 | OM_NET_TYPE1.PNG |

Fig. 26

| Tool ID | Tool name | Tool version | Registry path |
|---|---|---|---|
| 001 | CX-Programmer | 3.0 | ¥SOFTWARE¥OM¥CX-Programmer |
| 002 | CX-Motion | 2.0 | ¥SOFTWARE¥OM¥CX-Motion |
| 003 | CX-Protocol | 1.0 | ¥SOFTWARE¥OM¥CX-Protocol |
| 004 | NS-Designer | 3.0 | ¥SOFTWARE¥OM¥NS-Designer |
| 005 | Network monitor | 1.0 | ¥SOFTWARE¥OM¥NetworkMonitor |

Fig. 27

| ID | Type | Name | Rectangular coordinate | NET / NODE No. |
|---|---|---|---|---|
| 001 | 6234 | NET1 | Coordinate of NET1 | 001-#00 |
| 002 | 6234 | NET2 | Coordinate of NET2 | 002-#00 |
| 003 | 1138 | Node_A | Coordinate of Node_A | 001-#01 |
| 004 | 1138 | Node_B | Coordinate of Node_B | 001-#02 |
| 005 | 1138 | Node_C | Coordinate of Node_C | 001-#03 |
| 006 | 1138 | Node_D | Coordinate of Node_D | 001-#04<br>002-#01 |
| 007 | 1138 | Node_E | Coordinate of Node_E | 002-#02 |
| 008 | 1138 | Node_F | Coordinate of Node_F | 002-#03 |

Fig. 28

| Component ID | Component type | Coordinate information |
|---|---|---|
| 100 | CS1W-OC201 | X=10, Y=10 |
| 120 | CS1WID211 | X=15, Y=10 |
| 086 | CS1W-CLK12 | X=20, Y=10 |
| 001 | CS1H-CPU67H | X=25, Y=10 |
| 210 | C200HW-PA204S | X=35, Y=10 |

[DEV]DEV:CS1H;CPU:CPU67;[NET]NET:TOOLBUS;[DRVR]PORT:COM1,9600,None,8,1
[ADDRESS]DNA:1;DA1:2;DA20:

| Component ID | Component type | Manufacturer | Component version | Component specifying means ID | Setting tool ID | Drawing file name | Drawing size |
|---|---|---|---|---|---|---|---|
| 001 | CS1H-CPU67H | OMR Co. | 1.00 | 001 | 001 | OM_CS1H_CPU67H.PNG | length:20, width:10 |
| 002 | CS1H-CPU66H | OMR Co. | 1.00 | 001 | 001 | OM_CS1H_CPU67H.PNG | length:20, width:10 |
| 003 | XXXX-XX | XXX Company | 2.10 | 031 | 025 | XX_XXXX_XX.PNG | length:20, width:10 |
| 004 | XXXX-YY | XXX Company | 1.25 | 032 | 025 | XX_XXXX_YY.PNG | length:20, width:10 |

Fig. 39B

| Component specifying means ID | Communication transaction soft module | Communication message soft module | Communication system soft module |
|---|---|---|---|
| 001 | FINS | FINS | FINS |
| ⋮ | | | |
| 031 | XX_T1 | XX_M1 | XX_P1 |
| 032 | XX_T1 | XX_M2 | XX_P1 |

CONTROL SYSTEM APPARATUS, METHOD FOR SETTING CONTROL SYSTEM AND SETTING PROGRAM

BACKGROUND OF THE INVENTION

1. Field of the Related Art

The present invention relates to a control system setting apparatus for setting a control system constituted of a PLC (programmable logic controller, or programmable controller), other components for control, and a network. The present invention also relates to a setting program for use in the control system setting apparatus and a method for setting the control system.

2. Description of the Related Art

A network of a control system is formed of a plurality of layers, and a large number of kinds of networks are used. Depending on the kinds of networks, a form of a network (master and slave type, pier to pier type, etc.), the number of connected components, communication protocol, a communication command system and the like are different among networks, and hence an appropriate kind of network is selected according to application of a network.

When a control system is constituted and the activation thereof started, there is a need for selecting the kind of network to be used in the control system as well as appropriate components for constituting the control system, to set a parameter appropriate for each component. There may also be a need for performing the same operation in changing or maintaining the control system.

In setting a component constituting the control system, a computer having installed a program for setting (setting program) is used, and in particular, a small-sized or portable computer, such as a personal computer, is used.

One example of the setting program is "DeviceNet Configurator", manufactured by OMRON Corporation. "DeviceNet Configurator" can be used only when the kind of network is a component network. The Non Japanese Patent Laid-Open No. 2001-53763 is the operator manual of the program.

The operation manual of this software is "DeviceNet Configurator Ver. 2 Operation Manual" by OMRON Corporation, as of Sep. 22, 2004. This manual can be downloaded from the Internet URL: http://www.fa.omron.co.jp/lineup/plc/29/81/83/index1.html, shown in the column of the "Non Japanese Patent Laid-Open No. 2001-53763".

In Chapter 3 "Basic Operation", and Chapter 4 "Editing of Device Parameter" of this operation manual, the following description is made.

A main window displayed on a display screen of a computer having installed therein a setting program is constituted of a hardware list and a network constitution window. In the hardware list shown are components having installed an EDS (Electronic Data Sheet) file therein. The EDS file is a text file made by editing parameter information on a device to be used in a device network (DeviceNet), based on application of DeviceNet.

Firstly, a straight-line figure, showing a network communication route, is displayed on the network constitution window. A device in the hardware list is then dragged and dropped into the network constitution window so that the device is added to the network. In the network constitution window, an icon represents a component. When the icon representing the device is selected and then the "edit" menu selected, a window of editing a device parameter is displayed where the parameter can be edited.

Japanese Patent Laid-Open No. 2001-53763 describes a computer for setting a programmable controller. Herein, an assumption is made to allow the computer to communicate with the programmable controller through any one of plural kinds of networks.

Japanese Patent Laid-Open No. 2001-53763 describes the following: Routes to be connected are listed on the display screen of the computer, and in the image selection section, a list of image names is displayed. The image name here may for example be "Ethernet board communication, Access another channel via Ethernet", and shows a communication route from the computer to the programmable controller. Although the kind of network in this example is Ethernet, selecting a communication route via another kind of network is also possible.

Once one image name is selected, an image diagram corresponding to the image name selected is displayed at the image display section. The image diagram consists of the computer, the programmable controller to communicate with, and another programmable controller and a network communication route to serve as communication routes.

(Non Japanese Patent Laid-Open No. 2001-53763) The operation manual of this software is "DeviceNet Configurator Ver. 2 Operation Manual" by OMRON Corporation, as of Sep. 22, 2004. This manual can be downloaded from the Internet URL: http://www.fa.omron.co.jp/lineup/plc/29/81/83/index1.html.

DISCLOSURE OF THE INVENTION

In the control system, there are a number of choices in the kind of network that can be used. It is not uncommon that one user has to use plural kinds of networks. In this case, if the setting program in use has been developed only for one specific kind of network, such as "DeviceNet Configurator" of the non patent document 1, another setting program is required when using another kind of network. For this reason, in the case of setting a component connected to a control system constituted using different kinds of networks, it is necessary to prepare a setting program for each network and switch a setting program to be used according to the kind of network to which a component to be set is connected. However, it is a complicate practice for the user to appropriately make such a switch. Further, it is not easy for the user to familiarize plural kinds of setting programs having been developed independently.

The setting program of Japanese Patent Laid-Open No. 2001-53763 corresponds to plural kinds of networks. However, a component connected to the network but not serving as a communication route is not displayed on an image picture. Namely, in this setting program, attention is focused on an individual communication between a computer for setting and each programmable controller. It is therefore not possible to grasp the entire constitution of the network from the screen display of this setting program.

An object of the present invention is to perform an operation for integratedly setting a control system.

A control system setting apparatus for setting a control system according to the present invention connects with the control system including a plurality of components connected by a network and comprises a computer including a processor, a storage device, an input device, a display, and an interface connectable to the control system. The computer is accessible to component profile data where a profile of a component is written. The component profile data is prepared for each kind of components. The storage device stores a setting program for causing the processor to execute a prescribed operation. The prescribed operation is performed by executing the processes of: accepting a kind of networks to be used selected by operation of the input device; accepting a kind of component to be used selected by operation of the input device; checking for adaptability between the network and the component based on the component profile data prior to or after the selection of the kind of component to be used, and giving a permission to use the component in a network block diagram representing the control system on condition that the component is adaptable to the network intended to be connected; displaying on the display the network block diagram by the use of a figure showing the selected network as well as a figure showing the component selected and permitted to be used; accepting an operation performed by the input device to select any one of the components included in the network block diagram; displaying on the display a setting screen concerning the selected component; accepting a setting operation performed by the input device in the setting screen; and sending data set concerning the component to the corresponding component through the interface.

With this control system, uniformity can be obtained in which one setting program can handle plural kinds of networks, and support can also be obtained for securing adaptability between a network and a component, thereby facilitating setting of a control system.

Herein, the case where "the component is adaptable to the network intended to be connected" may be exemplified by the case where the kind of network to which a component is connectable is written in the profile data of the component, and the kind of network written on the profile data is consistent with the kind of network intended to connect the component.

On the premise of this control system setting apparatus, a variety of characteristics can be added as described below. The setting program can include a process of displaying on the display a list of components connectable to a network based on profile data of those components in a state where the kind of network to which the component is connected is specified, to accept an operation performed by the input device to select a component to be connected to the network out of the components in the list. Herein, "a list of components" may be in a form of a list, a table or arrangement of icons. The form of "a list of components" is not object.

The component profile data can include information on designation of a transfer program for processing a communication flow. The setting program can include plural kinds of transfer programs, and a process of communication with a component to communicate with according to the information on designation of a transfer program included in the component profile data of the component, using the designated transfer program.

The component profile data can include information on designation of a messenger program for constituting a communication command. The setting program can include plural kinds of messenger programs and a process of communication with a component to communicate with according to the information on designation of a messenger program included in the component profile data of the component, using the designated messenger program.

The component profile data can include restart information to show the need for restarting after setting. When profile data of a component to be set includes restart information, the setting program can include a process of sending a restart command to the corresponding component through the interface after sending data set concerning the component to the corresponding component.

The component profile data can include information corresponding to a type of a component. The setting program can include a process of obtaining information corresponding to the type of the component to communicate with from the same component to determine whether the obtained information corresponding to the type of the component is consistent with the information corresponding to the type of the component, which is included in the profile data of the component. By the use of the obtained information, it is possible to prevent continuing communication with a wrong component.

The setting program can be constituted to include the processes of: displaying a network block diagram on one window; displaying equipment comprising a plurality of components in the network block diagram; displaying on another window equipment block diagram showing components included in selected equipment, using figures showing the components, when an object selected by the operation of the input device for editing is equipment comprising a plurality of components; accepting an operation performed by the input device to select any one of the components included in the equipment block diagram; and displaying a setting screen concerning the selected component on the display.

The setting program can be constituted to include the processes of: receiving data registered in a component from the component through the interface; replacing at least part of the data received with data set in the setting operation to prepare an updated setting data; and sending the updated setting data toward the component corresponding thereto through the interface.

The component profile data can be written in an extensible markup language, and included in a file provided for each kind of components.

Another control system setting apparatus of the present invention connects with a control system including a plurality of components connected by a network, to be used for setting the control system. The control system setting apparatus is composed of a computer, which comprises a processor, a storage device, an input device, a display, and an interface connectable to the control system. The computer is accessible to network profile data where the profile of the network is written as well as component profile data where a profile of a component is written. The network profile data is prepared for each kind of networks. The component profile data is prepared for each kind of components. The storage device stores a setting program for causing the processor to execute a prescribed operation. The prescribed operation is performed by executing the processes of: accepting a kind of network to be used selected by operation of the input device; accepting a kind of component to be used selected by operation of the input device; checking for adaptability between the network and the component based on at least either the network profile data or the component profile data prior to or after the selection of the kind of component to be used, and giving a permission to use the component in a network block diagram representing the control system on condition that the component is adaptable to the network intended to be connected; displaying on the display the network block diagram by the use of a figure showing the selected network as well as a figure showing the component selected and permitted to be used; accepting an operation performed by the input device to select any one of the components included in the network block diagram; displaying on the display a setting screen concerning the selected component; accepting a setting operation performed by the input device in the setting screen; and sending data set concerning the component to the corresponding component through the interface.

With this control system, uniformity can be obtained in which one setting program can handle plural kinds of networks, and also support can be obtained for securing adaptability between a network and a component, thereby facilitating setting of a control system.

Herein, the case where "the component is adaptable to the network intended to be connected" is exemplified as follows.

(a) When the kind of network to which a component is connectable is written on the profile data of the component, the kind of network written on the profile data is consistent with the kind of network intended to connect the component.

(b) When the maximum number of nodes of a network is written on the profile data of the network, the number of components connected to the network, added with the number of components the network intended to connect, does not exceed the maximum number of nodes written on the profile data of the network.

(c) When the maximum number of master-type components connectable to a network is written on the profile data of the network and whether a component is a master-type component or not is written on the profile data of the component, the number of master-type components connected to the network, even after connection of the component to the network, does not exceed the maximum number of master-type components written on the profile data of the network.

On the premise of this control system setting apparatus, a variety of characteristics can be added as described below. The network profile data and the component profile data can be written in an extensible markup language, and included in a file provided for each kind of components.

The storage device stores a project where data concerning one control system to be set are collected. The project comprises: information specifying a network, concerning each network included in the control system; information specifying a node, concerning each node of the network; information specifying a component concerning each component connected to the network; linking information for making the information specifying a component concerning each component connected to the network and the information specifying a node concerning each node of the network correspond to each other; and information for grouping information each specifying a component concerning a component included in one piece of equipment. The information specifying a network and the information specifying a component include information specifying profile data corresponding to the network or the component. The information specifying a network and the information specifying a node concerning a node of the network are made to correspond to each other. The setting program can be constituted to include a process of displaying a network block diagram, using information included in the project, to access profile data corresponding to a network or a component selected by the operation of the input device. Further more, various kinds of profiles, which can be added to the former control system setting apparatus, can also be added to this component system setting apparatus.

A yet another control system setting apparatus of the present invention connects with a control system including a plurality of components connected by a network, to be used for setting the control system. The control system setting apparatus is composed of a computer, which comprises a processor, a storage device, an input device, a display, and an interface connectable to the control system. The storage device stores a setting program for causing the processor to execute a prescribed operation, a special tool as a program for setting a specific kind of network or specific kind component, and information for making each special tool and a specific kind of network or a specific kind of component, to be set by the special tool, correspond to each other. The prescribed operation is performed by executing the processes of: accepting a kind of network to be used selected by operation of the input device; accepting a kind of component to be used selected by operation of the input device; displaying on the display a network block diagram by the use of a figure showing the selected network as well as a figure showing the selected component; accepting an operation performed by the input device to select any one of the networks or components included in the network block diagram; and activating the special tool made to correspond to the selected network or component.

With this constitution, one setting program activates each special tool thereby to facilitate obtaining both uniformed operationality and enough support by a special tool. A specific component to be set by a special tool may a group of components including plural kinds of components.

The computer can be constituted to be accessible to component profile data where a profile of a component is written. The component profile data is prepared for each kind of components. The setting program can be constituted to include a process of checking for adaptability between the network and the component based on the component profile data prior to or after the selection by the input device of the kind of component to be used, and giving a permission to use the component in a network block diagram representing the control system on condition that the component is adaptable to the network intended to be connected.

Further, the computer can be constituted to be accessible to network profile data where a profile of a network is written as well as component profile data where a profile of a component is written. The network profile data is prepared for each kind of networks. The component profile data is prepared for each kind of components. The setting program can be constituted to include a process of checking for adaptability between the network and the component based on at least either the network profile data or the component profile data prior to or after the selection by the input device of the kind of component to be used, and giving a permission to use the component in a network block diagram representing the control system on condition that the component is adaptable to the network intended to be connected.

A setting program according to the present invention is installed in a computer accessible to component profile data and comprising a processor, an input device, a display, and an interface connectable to a control system, to make the processor perform a prescribed operation. The component profile data is data where a profile of a component is written, and prepared for each kind of components. The prescribed operation is performed by executing the processes of: accepting a kind of network to be used selected by operation of the input device; accepting a kind of component to be used selected by operation of the input device; checking for adaptability between the network and the component based on the component profile data prior to or after the selection of the kind of component to be used, and giving a permission to use the component in a network block diagram representing the control system on condition that the component is adaptable to the network intended to be connected; displaying on the display the network block diagram by the use of a figure showing the selected network as well as a figure showing the component selected and permitted to be used; accepting an operation performed by the input device to select any one of the components included in the network block diagram; displaying on the display a setting screen concerning the selected component; accepting a setting operation performed by the input device in the setting screen; and sending data set concerning the component to the corresponding component through the interface.

Another setting program according to the present invention is installed in a computer accessible to network profile data as well as component profile data and comprising a processor, an input device, a display, and an interface connectable to a control system, to make the processor perform a prescribed operation. The network profile data is data where a profile of a network is written, and prepared for each kind of networks. The component profile data is data where a profile of a component is written, and prepared for each kind of components. The prescribed operation is performed by executing the processes of: accepting a kind of network to be used selected by operation of the input device; accepting a kind of component to be used selected by operation of the input device; checking for adaptability between the network and the component based on at least either the network profile data or the component profile data prior to or after the selection of the kind of component to be used, and giving a to use the component in a network block diagram representing the control system on condition that the component is adaptable to the network intended to be connected; displaying on the display the network block diagram by the use of a figure showing the selected network as well as a figure showing the component selected and permitted to be used; accepting an operation performed by the input device to select any one of the components included in the network block diagram; displaying on the display a setting screen concerning the selected component; accepting a setting operation performed by the input device in the setting screen; and sending data set concerning the component to the corresponding component through the interface.

An yet another setting program according to the present invention is installed in a computer comprising a processor, a storage device, an input device, a display, to make the processor perform a prescribed operation, the storage device storing therein a special tool as a program for setting a specific kind of network or specific kind component, and also storing information for making the special tool and a specific kind of network or a specific kind of component, to be set by the special tool, correspond to each other. The prescribed operation is performed by executing the processes of: accepting a kind of network to be used selected by operation of the input device; accepting a kind of component to be used selected by operation of the input device; displaying on the display a network block diagram by the use of a figure showing the selected network as well as a figure showing the selected component; accepting an operation performed by the input device to select any one of the networks or components included in the network block diagram; and activating the special tool corresponding to the selected network or the selected component.

A method for setting a control system according to the present invention is executed using a computer system composed of a computer, or a plurality of computers, which is accessible to component profile data and comprises an input device, a display, and an interface connectable to a control system. The component profile data is prepared for each kind of components. The method for setting a control system executes the processing steps of: accepting a kind of network to be used selected by operation of the input device; accepting a kind of component to be used selected by operation of the input device; checking for adaptability between the network and the component based on the component profile data prior to or after the selection of the kind of component to be used, and giving a permission to use the component in a network block diagram representing the control system on condition that the component is adaptable to the network intended to be connected; displaying on the display the network block diagram by the use of a figure showing the selected network as well as a figure showing the component selected and permitted to be used; accepting an operation performed by the input device to select any one of the components included in the network block diagram; displaying on the display a setting screen concerning the selected component; accepting a setting operation performed by the input device in the setting screen; and sending data set concerning the component to the corresponding component through the interface.

Another method for setting a control system according to the present invention is executed using a computer system composed of a computer, or a plurality of computers, which is accessible to network profile data and component profile data, and comprises an input device, a display, and an interface connectable to a control system. The network profile data is prepared for each kind of networks. The component profile data is a data where profiles of the component are written. The component profile data is prepared for each kind of components. The method for setting a control system executes the processing steps of: accepting a kind of network to be used selected by operation of the input device; accepting a kind of component to be used selected by operation of the input device; checking for adaptability between the network and the component based on at least either the network profile data or the component profile data prior to or after the selection of the kind of component to be used, and giving a permission to use the component in a network block diagram representing the control system on condition that the component is adaptable to the network intended to be connected; displaying on the display the network block diagram by the use of a figure showing the selected network as well as a figure showing the component selected and permitted to be used; accepting an operation performed by the input device to select any one of the components included in the network block diagram; displaying on the display a setting screen concerning the selected component; accepting a setting operation performed by the input device in the setting screen; and sending data set concerning the component to the corresponding component through the interface.

A yet another method for setting a control system according to the present invention is executed using a computer system composed of a computer, or a plurality of computers, which comprises an input device, a display, and an interface connectable to a control system, makes a special tool as a program for setting a specific kind of network or specific kind component executable, and is accessible to information for making the special tool and a specific kind of network or a specific kind of component, to be set by the special tool, correspond to each other. The method for setting a control system executes the processing steps of: accepting a kind of network to be used selected by operation of the input device; accepting a kind of component to be used selected by operation of the input device; displaying on the display the network block diagram by the use of a figure showing the selected network as well as figures showing the components selected; accepting an operation performed by the input device to select any one of the networks or components included in the network block diagram; and activating a special tool made to correspond to the selected network or component.

Therefore, the present invention allows a control system to be integratedly set in a variety of situations, thereby facilitating an operation for setting a control system.

BRIEF DESCRIPTION OF THE DRAWINGS

FIG. 6 shows a view showing one example of an overall structure of a CPS.

FIG. 7 shows one example of a detailed overall structure of a CPS.

FIG. 8 shows a view showing one example of “Component” element.

FIG. 9 shows a view showing one example of “Component” element of a component having a communication interface.

FIG. 10 shows a view showing one example of a “Parameters” element.

FIG. 11 shows a view showing one example of “ImageFile” element in a CPS.

FIG. 12 shows a view showing one example of “AddOnFunctions” element in a CPS.

FIG. 13 shows a view showing one example of a CPS of a network.

FIG. 14 shows a view showing one example of a CPS of a network having “Parameters” element.

FIG. 24 shows a view showing one example of a data structure of a component control table.

FIG. 25 shows a view showing one example of a data structure of an icon control table.

FIG. 26 shows a view showing one example of a data structure of a tool control table.

FIG. 27 shows a view showing one example of a data structure of a network constitution information database 112*a*.

FIG. 28 shows a view showing one example of a data structure of an equipment constitution information database 112*b*.

FIG. 30 shows a view showing one example of communication setting information.

FIGS. 39A and 39B shows a view showing one example of a data structure of a component management table.

DESCRIPTION OF THE PREFERRED EMBODIMENTS

Figure 1:
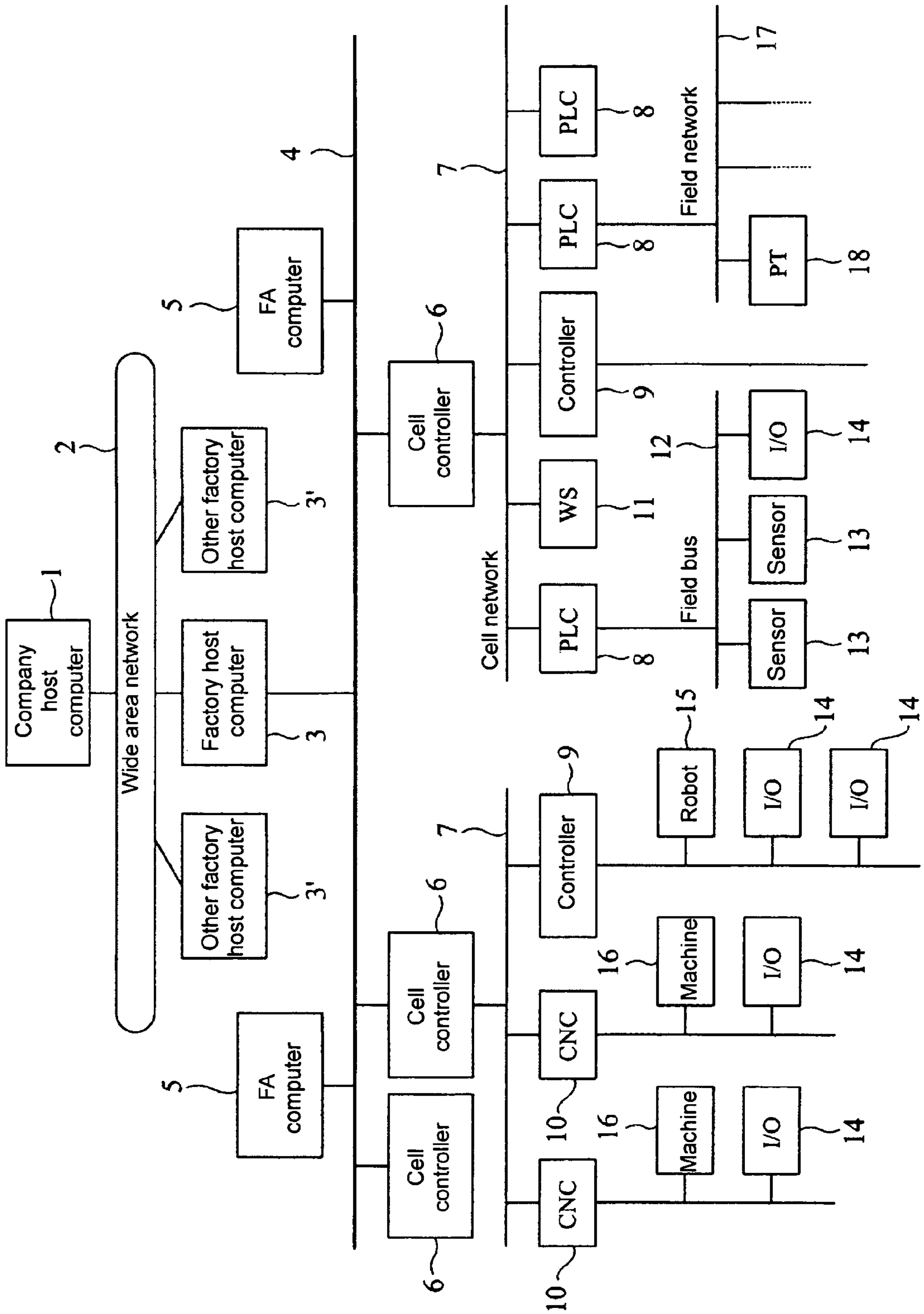
FIG. 1 shows a view showing one example of information system related to production in a company

FIG. 1 shows positions of networks in FA/CIM (Factory Automation/Computer Integrated Manufacturing). This diagram shows an information system related to production in a company. The information system has a hierarchical structure in which a network organically links from the low level to the high level.

The highest level of this information system is a company host computer 1 operated for company business management. The company host computer 1 is connected to a factory host computer 3 and to other factory host computers 3' through a wide area network 2. The factory host computer 3 and the other factory host computers 3' are set up respectively in factories dotted over a variety of regions, and operated for factory business management by creating production plans, shipment plans or the like in the respective factories.

The factory host computer 3 is connected to a basic LAN (Local Area Network) 4 positioned at a lower level. The basic LAN 4 is a mainline network in a factory. FIG. 1 shows the state in which a FA computer 5 and a cell controller 6, constituting a production section, are connected to the basic LAN 4. In addition to this, however, computers set up respectively in a design, development, materials, sales, general affairs and accounting sections, and other sections, which support the production, are also connected to the basic LAN 4.

The FA computer 5 is a computer for managing production on a production line. Production on a production line is managed for example by executing a variety of processes, such as a process of preparing a production schedule, a process of giving an instruction to the cell controller 6 according to the prepared schedule, and a process of collecting production performance information from the cell controller 6 and managing the collected production performance information.

A cell is a unit in a series of production, and for example is a unit on a variety of production lines, such as an assembly line of printed circuit boards or a processing line of parts to be used for final products. The cell controller 6 is a computer for managing production on a production line and monitoring and managing operation of the production line. The cell controller 6 gives specific instructions, such as a processing method and an assembly method, and the number of products used therein, which are necessary for actually operating facilities, to control equipment for managing a machine and the like to execute actual processes including assembly and processing on the production line.

The cell controller 6 is connected to a cell network 7 positioned at a lower level. This cell network 7 is constituted using Ethernet (registered trade name) or the like. The cell network 7 is connected with control equipment such as a PLC 8, a robot controller 9, and a CNC (Computerized Numerical Controller) 10, a WS (Work Station) 11, and the like. The specific instructions issued in the cell controller 6 are sent therefrom to the corresponding control equipment through the cell network 7. Further, each control equipment sends a report on the actual numbers of process and assembly performed according to the specific instructions, to the upper-level cell controller 6. Each control equipment also reports facility information and preservation information, such as operating time and the number of operating times, to the cell controller 6. Upon receipt of such information, the cell controller 6 reports the information, in real time or as production-performance information and quality information by a certain unit, to the higher-level FA computer 5. The foregoing instructions from the upper level to the lower level and the foregoing reports from the lower level to the upper level are respectively sent through a network. Further, the communications made through a network are not limited to communications to the upper or lower level; there are communications between computers or a piece of equipment at the same level through a network. One example of the communications between pieces of equipment at the same level is the case of the PLCs 8 both connected to the cell network 7. Those PLCs 8 can share their IO data by data linking or the like to perform a synchronous or cooperative operation, or PLCs 8 can execute calculation processing based on input data and give the robot controller 9 the result of the calculation as a command value.

This cell network 7 handles real-time information on a production line, and is thus required to send information at high speed without a large delay. The cell network 7 is also required to issue the "assurance of arrival" of information, which assures arrival of information at a receiver within necessary time.

The PLC 8 is connected to a sensor 13 or I/O (Input/Output) 14 through a fieldbus 12. The fieldbus 12 is a network handling an ON/OFF signal as a basis of the sequence control. The I/O 14 is a generic term of an input component and an output component handling an ON/OFF signal (1 bit). A sensor 13 here is an analog sensor. A proximity sensor or other sensors handling an ON/OFF signal (1 bit) correspond to the I/O 14. Although not shown in the diagram, there is a case where the PLC 8 comprises the IO unit so as to be directly connected with input components such as a sensor and a switch, as well output components such as an actuator. Further, the PLC 8 is connected to a PT (Programmable Terminal 18), a barcode reader, and the like through the field network 17. In such a manner, the field network 17 handles information-oriented data.

Moreover, the robot controller 9 is connected to a robot 15, the I/O 14 and the like. Based on input data obtained from the I/O 14, input data obtained from other control equipment connected to the cell network 7 or the like, the operation of the robot 15 is controlled so that an instruction given from the cell controller 6 can be executed. The CNC 10 is connected to a machine 16 to be controlled, the I/O 14 and the like. Based on input data obtained from the I/O 14, input data obtained from other control equipment connected to the cell network 7 or the like, the operation of the machine 16 is controlled so that an instruction given from the cell controller 6 can be executed. Although not shown in the diagram, components at lower levels than the other factory host computers 3' are connected with the basic LAN 4 as well as each kind of system network, as in the case of the factory host computer 3.

The overall information system can be divided into two sections: a first section consists of the basic LAN 4 and the upper-level section than the basic LAN 4; a second section consists of the cell network 7 and the lower-level section than the cell network 7. The first section primarily handles production management information, such as a production instruction or production result, and is thereby referred to as an information-oriented system. Meanwhile, the second section primarily controls production facilities and is thereby referred to as a control-oriented system. Networks relevant to the present invention are mainly the cell network 7, and the field network 17 as well as the fieldbus 12 which are at lower levels than the cell network 7. Those networks all belong to the control-oriented system.

The present invention can be implemented regardless of the presence or absence of other networks at higher levels than the control system to be set. That is to say, FIG. 1 shows the overall production-related information system in a company, constituting CIM, in which the company host computer 1 is placed at the highest level and then a hierarchical structure is constructed thereunder through each kind of network; however, the present invention can still be implemented even if the system is constituted for example without connection to the host computers 1, 3 and 3' at high levels.

The network of the control system to be set in the present invention is for example connected with such components as the PLC 8, the robot controller 9, the CNC 10, other controllers, the sensor 13, and the I/O 14.

In the following embodiment, the term "control system" indicates a system consistent of the cell network 7, or one or a plurality of networks at a lower level than the cell network 7, and a group of components connected thereto. Further, the term "component" indicates a component that has one or more functions (functional objects) and is directly or indirectly connectable to a network. Examples of such component functions may include a ladder execution function, a communication function, a variety of control functions (temperature regulation, motion control and the like), and a variety of sensing functions. A so-called CPU unit, CPU high-functional unit, high-functional I/O unit, and device net master/slave are all regarded as components. In the meantime, the term "equipment" indicates equipment constituted of one or a plurality of components. For example, a rack constitution of one device of a device network or one CPU unit of a PLC is regarded as equipment. Naturally, a PLC constituted by connecting a plurality of units is also regarded as equipment.

Figure 2:
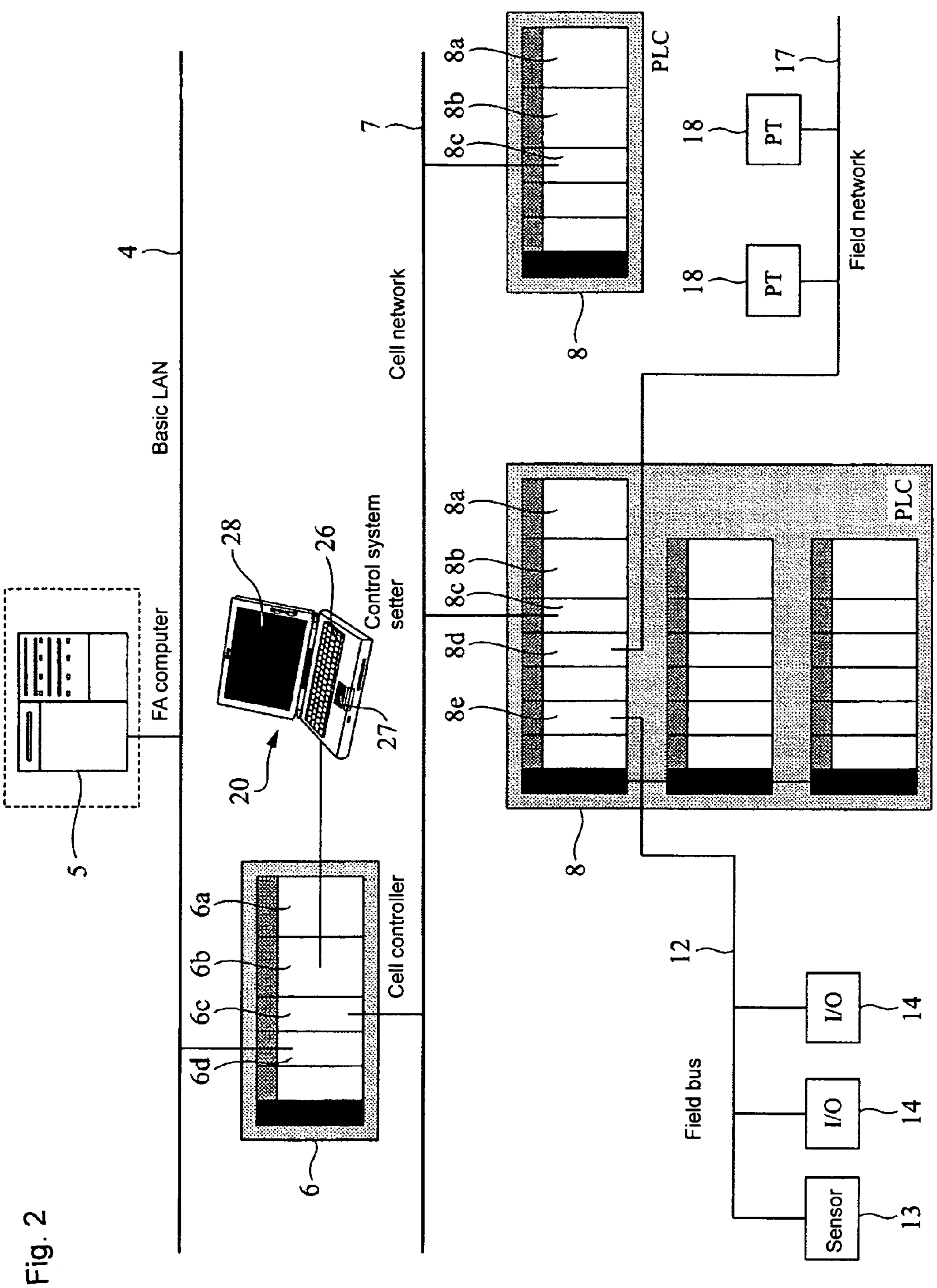
FIG. 2 shows a view showing one example of a control system.

FIG. 2 shows one example of a control system. The FA computer 5 and the cell controller 6 are connected to the basic LAN 4. With the foregoing relationship between an upper level and a lower level applied to FIG. 2, the FA computer 5 is positioned at a higher level than the basic LAN 4, and the cell controller 6 is positioned at a lower level than the basic LAN 4. In the present embodiment, the cell controller 6 is constituted of a PLC. The PLC constituting the cell controller 6 comprises a power source unit 6*a*, a CPU unit 6*b*, a first communication unit 6*c* corresponding to the communication protocol of the cell network 7, a second communication unit 6*d* corresponding to the communication protocol of the basic LAN 4, and the like.

The cell network 7 is connected with two PLCs 8. Those two PLCs 8 communicate with each other through the cell network 7 while communicating with the PLC constituting the higher-level cell controller 6. Although not shown in FIG. 2, the cell network 7 is connected with other variety of equipment as shown in FIG. 1. Further, the PLC 8 comprises a power source 8*a*, a CPU unit 8*b*, a first communication unit 8*c* corresponding to the communication protocol of the cell network 7, a communication unit 8*d* for field network, corresponding to the communication protocol of the field network 17, a communication unit 8*e* for fieldbus, corresponding to the communication protocol of the fieldbus 12, and the like. Units other than those are an IO unit, a variety of high functional units, and the like. Those units are combined as necessary according to application of the user to constitute a PLC. The PLC 8 is equipment and each unit constituting the PLC 8 is a component.

The field bus 12 is connected with the sensor 13, each kind of I/O 14 and other components. Those components for example communicate in the master/slave form with the communication unit 8*e* for field bus, to send thereto or receive therefrom input or output data. The field bus 12 is not limited to apply the master/slave communication. It may use a different communication protocol. The communication protocol to be used is determined according to a specific kind of field bus 12. Namely, there are plural kinds of networks that belong to the fieldbus 12. Accordingly, there are plural kinds of communication units 8*e* for field bus to correspond to the respective networks.

Further, a programmable terminal 18 is connected to the field network 17, which is connected to the communication unit 8*d* for field network. There are also plural kinds of field networks 17. Although FIG. 2 shows just one field bus 12 and one field network 17, other networks not shown in FIG. 2 naturally exist.

A control system setting apparatus 20 as an embodiment of the present invention is a laptop personal computer having installed a setting program and a setting data. The control system setting apparatus 20 is directly connected to a serial interface, such as RS-232C, provided in the CPU unit 6*b* of the cell controller 6 (PLC), and through the cell controller 6, the control system setting apparatus 20 can also communicate with other equipment and components connected to the control system. Although the control system setting apparatus 20 is constituted to be connected to the cell controller 6 in this embodiment, it may be connected to the PLC 8 positioned at a lower level than the cell network 7, or may be directly connected to the cell network 7. Further, although the control system setting apparatus 20 is constituted to be directly connected to a serial interface (serial port), such as RS-232C, provided in the CPU unit 6*b* of the PLC 6 in the present embodiment, it may be connected to another communication unit (capable of corresponding to the serial communication) constituting the PLC 6.

Figure 3:
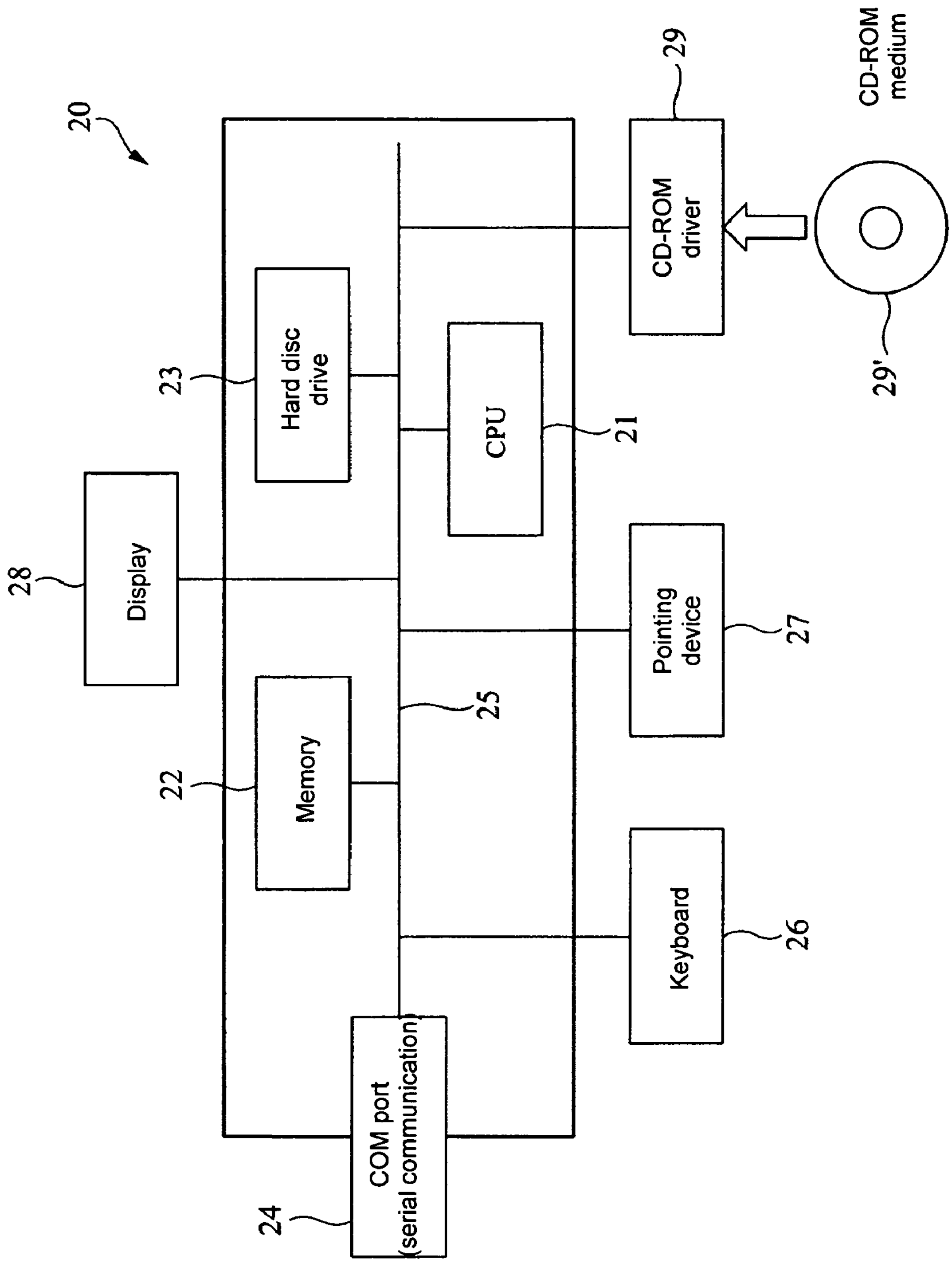
FIG. 3 shows a hardware block diagram showing a preferred embodiment of a control system setting apparatus according to the present invention.

FIG. 3 shows a hardware constitution of the control system setting apparatus 20. The control system setting apparatus 20 comprises, as internal equipment, a CPU 21, a memory 22, a hard disc drive 23, and a COM port 24. Those pieces of internal equipment are connected to a bus 25 and send and receive necessary data through the bus 25. The CPU 21 is a processor that executes an application program installed therein. The memory 22 is a temporary storing devices of an RAM and the like, and for example is used as a work RAM when the CPU 21 executes calculation. The hard disc drive 23 accesses an internal hard disc to read or write data. The hard disc drive 23 and the internal hard disc constitute storage device. The foregoing application program is stored in this internal hard disc. The COM port 24 is an interface to be connected to external equipment, and in this example, the COM port 24 is a serial port, such as RS-232C. The control system setting apparatus 20 is connected to the CPU unit 6*b* of the PLC constituting the cell controller 6 through the COM port 24.

The control system setting apparatus 20 comprises, as external equipment, input device such as a keyboard 26 and a pointing device 27, a display 28, and CD-ROM drive 29. The keyboard 26, the pointing device 27 and the display 28 are also shown in the control system setting apparatus 20 of FIG. 2. The pointing device 27 is not shown in FIG. 2. The pointing device 27 may be an external mouse.

A setting program, one of applications programs, is stored in a non-transitory computer readable medium, such as a CD-ROM medium 29'. This CD-ROM medium 29' with the setting program stored therein is provided to the user. The user inserts the CD-ROM medium 29' into the CD-ROM drive 29, and operates the keyboard 26 and the pointing device 27, to install the setting program into a laptop personal computer. The installed setting program is stored in the internal hard disk drive. This personal computer with the setting program installed therein becomes the control system setting apparatus 20.

Downloading from the Internet site may provide the setting program. Moreover, network profile data and component profile data are provided to the user from the CD-ROM medium 29' or by downloading from the Internet site, and stored in the internal hard disc.

Figure 4:
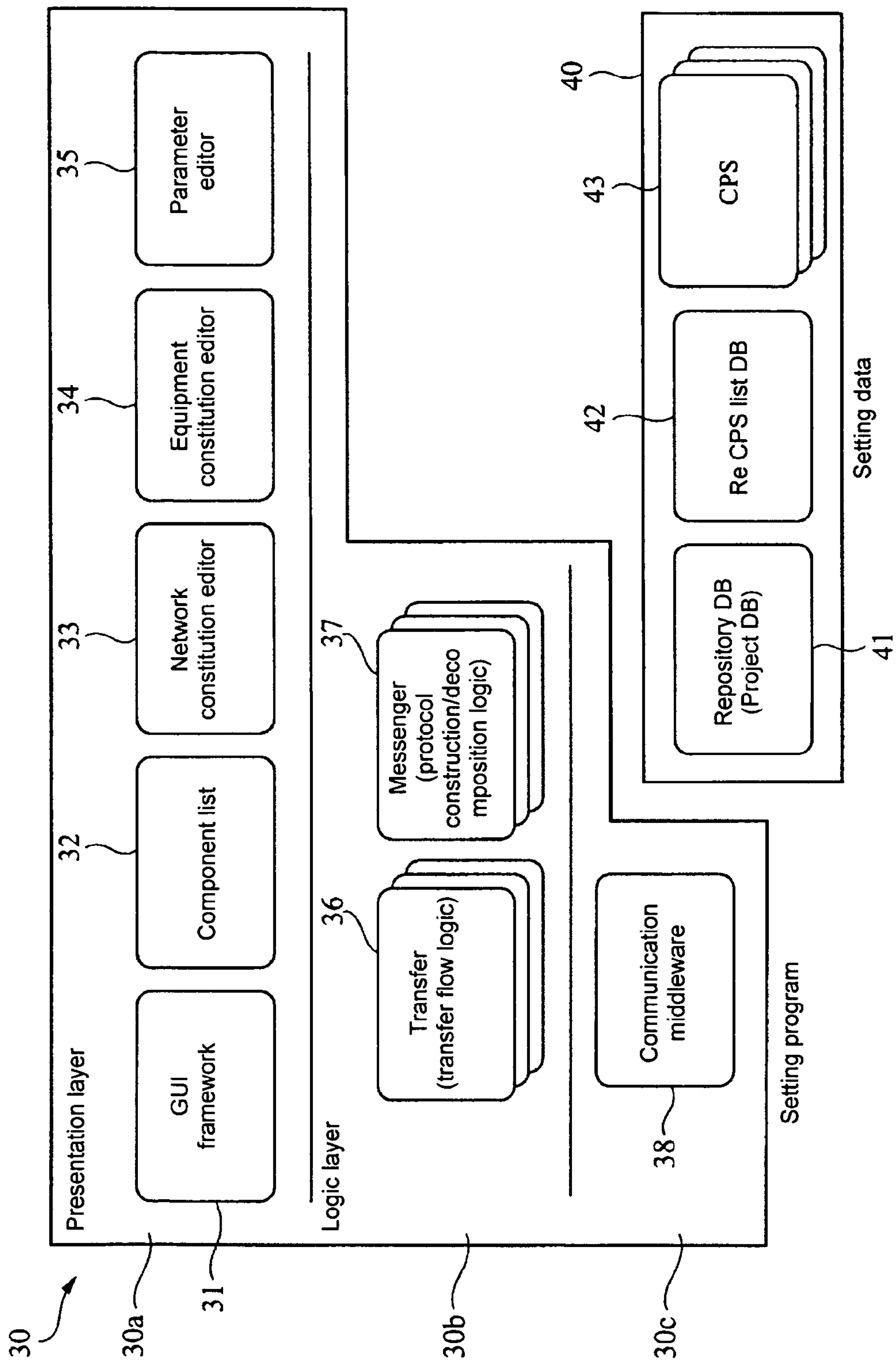
FIG. 4 shows a view showing one example of data structures of a setting program and setting data.

FIG. 4 shows a constitution of a setting program 30, stored in the internal hard disc of the control system setting apparatus 20, and a constitution of a setting data 40. The setting program 30 consists of three layers in descending order: a presentation layer 30*a*, a logic layer 30*b* and a communication middleware layer 30*c*.

The presentation layer 30*a* is a layer for creating a display on the display 28. A program included in this layer accesses each element in the setting data 40 and the logic layer 30*b*, to make a display related to the setting data, and also to edit and store the setting data.

The presentation layer 30*a* includes a GUI (Graphical User Interface) framework 31, a component list 32, a network constitution editor 33, an equipment constitution editor 34, and a parameter editor 35.

GUI framework 31 is a program for displaying a primary window of the setting program 30 on the display 28 of the control system setting apparatus 20 to execute each kind of operation accepted on this window. The primary window displayed by the GUI framework 31 is a frame for display by the component list 32 and the network constitution editor 33, and includes a menu or a button for accepting each kind of operation performed to the setting program 30.

The component list 32 is a program for displaying a list of usable components. The network constitution editor 33 is a program for displaying a network block diagram representing a control system, using an icon indicating a network and an icon indicating a component, to edit the constitution of the network. The equipment constitution editor 34 is a program for displaying an equipment block diagram representing a constitution of components in the equipment, to edit the constitution of the equipment. The parameter editor 35 is a program for displaying a window of editing a parameter value of a component or a network, to edit a parameter value.

A logic layer 30*b* is a layer having logic for communication with an actual component connected to a network. The logic layer 30*b* includes a transfer 36 and a messenger 37. The transfer 36 is a program for processing a communication flow, and also referred to as transfer flow logic. The messenger 33 is a program for building up a communication command to be sent and analyzing a received communication command, and also referred to as protocol construction/decomposition logic. The setting program 30 can include plural kinds of transfers 36 and messengers 37.

The communication middleware 38 is a control program for controlling a communication interface to communicate with an actual component connected to a network, and controls a lower-level, third layer of an OSI basic reference model (JIS X 5003). The communication command made by the messenger 37 is transferred to a component through the communication middleware 38.

The setting data 40 includes a repository database 41 (hereinafter abbreviated to "DB"), a CPS list DB 42 and a CPS 43.

The repository DB 41 stores a project, and thus it is also referred to as a project DB. A project is prepared for each control system to be set, and includes data and a parameter value concerning constructions of a network and a component in the control system to be sent.

Figure 5:
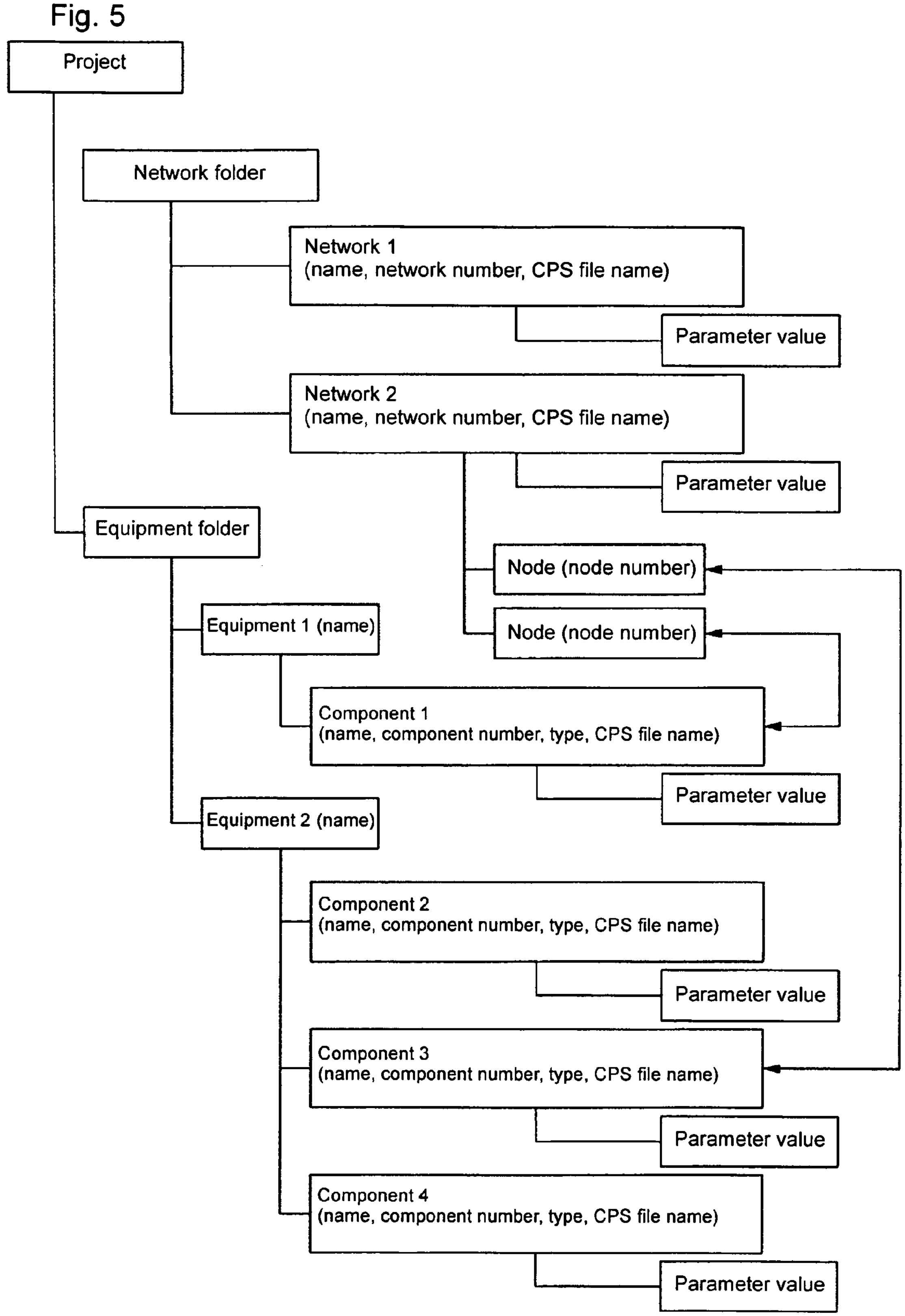
FIG. 5 shows a view showing one example of a structure of a project stored in a repository database.

A CPS (Component and network Profile Sheet) is a file for defining profiles of a component and a network, and the file is prepared for each kind or type of component and network. The CPS list DB 42 stores a list of CPSs, such as a list of file names of CPSs stored in the setting data 40. FIG. 5 shows a structure of a project to be stored in the repository DB. The project includes a network folder and an equipment folder. The network folder stores information specifying a network in the control system to be set. The information specifying a network includes the name of the information (name of the network), a network number, and a file name of a CPS of the network. This information is prepared as one file for each network.

The network number is a number for identifying each network in the control system to be set. The file name of the CPS is used to read the corresponding CPS 43. Further, each "information specifying a network" is made to correspond to information specifying a node. The information specifying a node includes a number of nodes. "Network 1" and "Network 2" in the project of FIG. 5 are information separately specifying a network. Hence two networks exist in the project of FIG. 5.

In the equipment folder, information specifying equipment in the control system to be set is stored. The information specifying equipment is for example a name of equipment. In each of "Equipment 1" and "Equipment 2" in FIG. 5, information specifying equipment, or a name of equipment, is stored. Equipment comprises one or more components, and hence information specifying equipment is made to correspond to information specifying the component included in the equipment.

Information specifying a component includes the name of the information (name of the component), a component number, the type of the component, and a file name of a CPS of the component. The component number is a number for identifying each component in the control system to be set. "Component 1" to "Component 4" in FIG. 5 are information each specifying one component, and including four pieces of information shown in the parentheses.

"Equipment 1" is made to correspond exclusively to "Component 1". This indicates that one component (Component 1) constitutes one piece of equipment (Equipment 1). Namely, Component 1 is singly connected to the network. Further, "Equipment 2" is made to correspond to a plurality of components ("Component 2", "Component 3" and "Component 4" in FIG. 5). This indicates that a plurality of components constitute one piece of equipment, and connected to the network.

The project includes parameter values of both a network and a component in the control system to be set. The parameter value of the network is made to correspond to information specifying the network to which the parameter value belongs. The parameter value of the component is made to correspond to information specifying the component to which the parameter value belongs.

The project further includes linking information making the following information correspond to each other: the information specifying a component, and information specifying a node of a network to which the component is connected. The information specifying a node is for example a number of nodes. In the example of FIG. 5, only "Component 3" among the components constituting "Equipment 2" is connected to the network ("Network 2").

FIG. 6 shows the overall structure of a CPS. In FIG. 6, <Cps>, <Component> and the like express elements. The mark "±" put on the elements other than <Cps> indicates omission of description of the elements. A CPS is described in an extensible markup language (e.g. XML). This makes it possible to change the CPS structure or add an element to the CPS, without having an effect on other elements.

XML will briefly be described as follows. XML is defined by JIS X 4159:2002, and generally has syntaxes as shown in the examples below.

Example 1

```
<TagName>
(Information of a different tag (child element))
</TagName>
```

Example 2

```
<TagName AttributeName = Attribute value/>
```

Example 3

```
<TagName AttributeName = Attribute value>
(another tag information (child element))
</Tag name>
```

A CPS is a file provided by a manufacturer of networks or components, and the description thereof is not changed by the user. The CPS comprises "Cps" element, "Component" element, "Network" element, "Parameter" element, "Enums" element, "Groups" element, "ExchangeableComObject" element and "AddOnFunctions" element. "Component" element and "Network" element are alternatively selected. Namely, "Component" element is used for a CPS of a component while "Network" element is used for a CPS of a network.

"Cps" element stores information on a CPS file in itself. "Component" element exists in a CPS of a component and stores a variety of information on the component. "Network" element exists in a CPS of a network and stores a variety of information on the network. "Parameters" element stores information on parameters of a component and a network. "Enums" element stores information on an optional list of parameter values. This information is used for the case where the parameter editor 35 displays the optional list on a window of the display 28 to allow an operator to select a parameter value.

"Groups" element defines a group of parameters, which is displayed using one list. "ExchangeableComObject" element stores information designating which program is used among programs (the transfer 36, the messenger 37) existent in the logic layer 30*b*. "AddOnFunctions" element stores information designating a special tool corresponding to a specific component or network. The special tool is a setting program developed exclusively for a specific component or network, and different from the setting program shown in FIG. 4. All the data included in the CPS are collectively called profile data. In the following, the foregoing representative elements will be described by means of concrete examples.

FIG. 7 shows a detailed overall structure of a CPS. Unlike the case in FIG. 6, the omission notation of the mark "±" is not used in the CPS of FIG. 7. Instead, the term "omitted" is used as an omission notation at places where a notation of a child element is omitted, to construct the entire structure of the CPS. As in Examples 2 and 3 above, an example of an attribute value of each "CPS" element and "Component" having a designated attribute value is shown. "ProductName="Serial communication unit"" in "Component" element defines a name of a product used to display. When another language is employed for display, the attribute value is changed.

FIG. 8 is one example of "Component" element. Herein, child elements are not omitted. "Component" element has data concerning component type information and basic characteristics of the component. The data concerning the basis characteristics of the component includes whether the component singly constitutes equipment or the component constitutes element with other elements. When this element defines: "EquipmentType="BuildingBlock"", a component for constituting equipment can be edited by the equipment constitution editor 34.

"CompoNotificationInfo" element as the child element of "Component" element defines: a method for obtaining component type information from an actual component connected (SourceData=); and component type information to be checked against the component type information obtained from the actual component (DestinationData).

"BuildingBlockInfo" element as the child element of "Component" element is used when the equipment construction editor 34 edits an equipment construction. Among the attribute values, when "RepresentCompo="Yes"", the component represents equipment including the component, and the network constitution editor 33 uses the type of component representing the equipment, to display the equipment. On the other hand, when "RepresentCompo="No"", the component constitutes the same equipment and becomes dependent on the above component defined by "RepresentCompo="Yes"", thereby enabling display and edition only in the equipment constitution editor 34. This element has no relation with whether the component is directly connected to a network or not. Namely, when equipment connected to a network exists, there are both cases where a component directly connected to the network is defined by "RepresentCompo="Yes"" and "RepresentCompo="No"".

FIG. 9 shows one example of "Component" element of a component having a communication interface. The component having the communication interface is singly connectable to a network, and directly connectable to a network among components constituting equipment. The component having a communication interface has "Communication" element as the child element of "Component" element. "Communication" element has "CommIF" element as the child element thereof in each communication interface. Further, "CommIF" element has "AttachableNetworkName" element as the child element thereof, followed by the kind of network to which the component is connectable as the value of the attribute "Networkname". In the case of the component corresponding to the CPS shown in FIG. 9, the component is connectable to two kinds of networks: "Compoway/F" and "GeneralSerial". "AttachableNetworkName" element further has "NetworkSubType" element as the child element thereof. "NetworkSubType" element specifies a type of a component. In FIG. 9, the attribute value of this element is "Type=Master", indicating that the component is a master-type component.

FIG. 10 shows one example of "Parameters" element. "Parameters" element has one or more of "Parameter" element as the child element thereof. "Parameter" element has information on a component parameter, and used in the parameter editor 35.

From the information of "Parameter" elements, the parameter editor 35 read a parameter name ("ManName"), the minimum value ("Min"), the maximum value ("Max"), a scale conversion in display ("ScalingMultipler", "ScalingDevider", "ScalingOffset"), a unit ("Unit"), the presence or absence of display (Disp), a display form (DispForm), a place of a decimal point (DecimalPlace), the presence or absence of zero suppression (ZeroSuppression), a designation of which list is used when the display form is "List" ("EnumName") to construct a parameter edition screen.

Further, "Parameter" element is also used by the messenger 37 when a parameter is transferred to an actual component. The messenger 37 reads information, required in transferring the parameter to an actual component, including a storage place ("AreaType"), a storage position ("Offset"), a bit-starting position when the parameter is bit information ("StartBit"), a storage form ("BinBCD"), and a storage area size ("DataSize"). The messenger 37 then constructs a communication command according to the descriptions of the above information and sends the command to the component through the communication middleware 38.

"Parameter" element does not include a parameter value in itself, but defines information on a display of a parameter on the control system setting apparatus 20, a storage area of the parameter in a component, and transfer of the parameter between the control system setting apparatus 20 and the component.

FIG. 11 shows one example of "ImageFile" element in a CPS. In this element, a file storing information on an icon to be displayed according to a component. FIG. 12 shows one example of "AddONFunctions" element in a CPS. "Application" element as the child element of "AddOnFunctions" element designates a name of a special tool ("CX-Protocol" in this example).

FIG. 13 is one example of a CPS of a network. The CPS of the network has "Network" element. "Network" element is used by the network constitution editor 33. The Network constitution editor 33 reads information on the network from "Network" element and checks whether the number of components to be connected to the network is the same as or smaller than the maximum number of nodes.

In FIG. 13, an attribute of "Network" element ("NetworkName) is followed by an attribute value "CompowayF". This attribute value indicates that the kind of network is "Compoway/F". Since "Compoway/F" is a master and slave network, "Network" element has "MasterAndSlave" element as the child element thereof. This element does not exist in a pier to pier network. The attribute ("NumberOfMasters") specifies the number of masters connectable to the network. In FIG. 13, this attribute is "1", indicating that the number of masters connectable to the network is just one. The component having the CPS shown in FIG. 9 is connectable to this network.

The kinds of networks prepared for this setting program other than the forgoing networks include "Controller Link" (attribute value: "ControllerLink), "DeviceNet" (attribute value: "DeviceNet"), a general serial (attribute value: "GeneralSerial"), Ethernet (attributed value: "Ethernet"), NTLink (attribute name: "NTLink") and SYSMAC Link (attribute name: "SysmacLink").

FIG. 14 shows one example of a CPS of a network having "Parameters" element. The attribute value ("ControllerLink") set to the attribute "NestworkName" of the "Network" element indicates that the kind of network to which this component is connectable is "Controller Link". Other attribute values of "Network" element are "0" as the minimum network number, "127" as the maximum network number, "1" as the minimum number of nodes, and "62" as the maximum number of nodes. Among the networks prepared for the setting program in this embodiment, only "Controller Link" requires "Parameters" element. CPSs of other kinds of networks do not have "Parameter" element.

The CPS of FIG. 14 has three "Parameter" elements: the maximum node address ("Name" attribute value: "MaximumNodeAddress"), the number of polled nodes per communication cycle ("Name" attribute value: "NumOfPolledNodesPerCommCycle), and the number of frames permitted to be sent per communication cycle ("Name" attribute value "NumOfEventFramesPerCommCycle).

When the kind of network is "Controller Link", a parameter value is transferred to a network and received by a component managing the network (managing station). The maximum node address value should be the same as or smaller than the maximum number of nodes set in "Network" element. After transfer of the maximum node address, a component having a node address that exceeds the maximum node address can no longer communicate.

This information is also used by the network constitution editor 31 where the same kind of checking is performed. This enables the operator to check a network constitution before actually transferring a parameter to a component.

Figure 15:
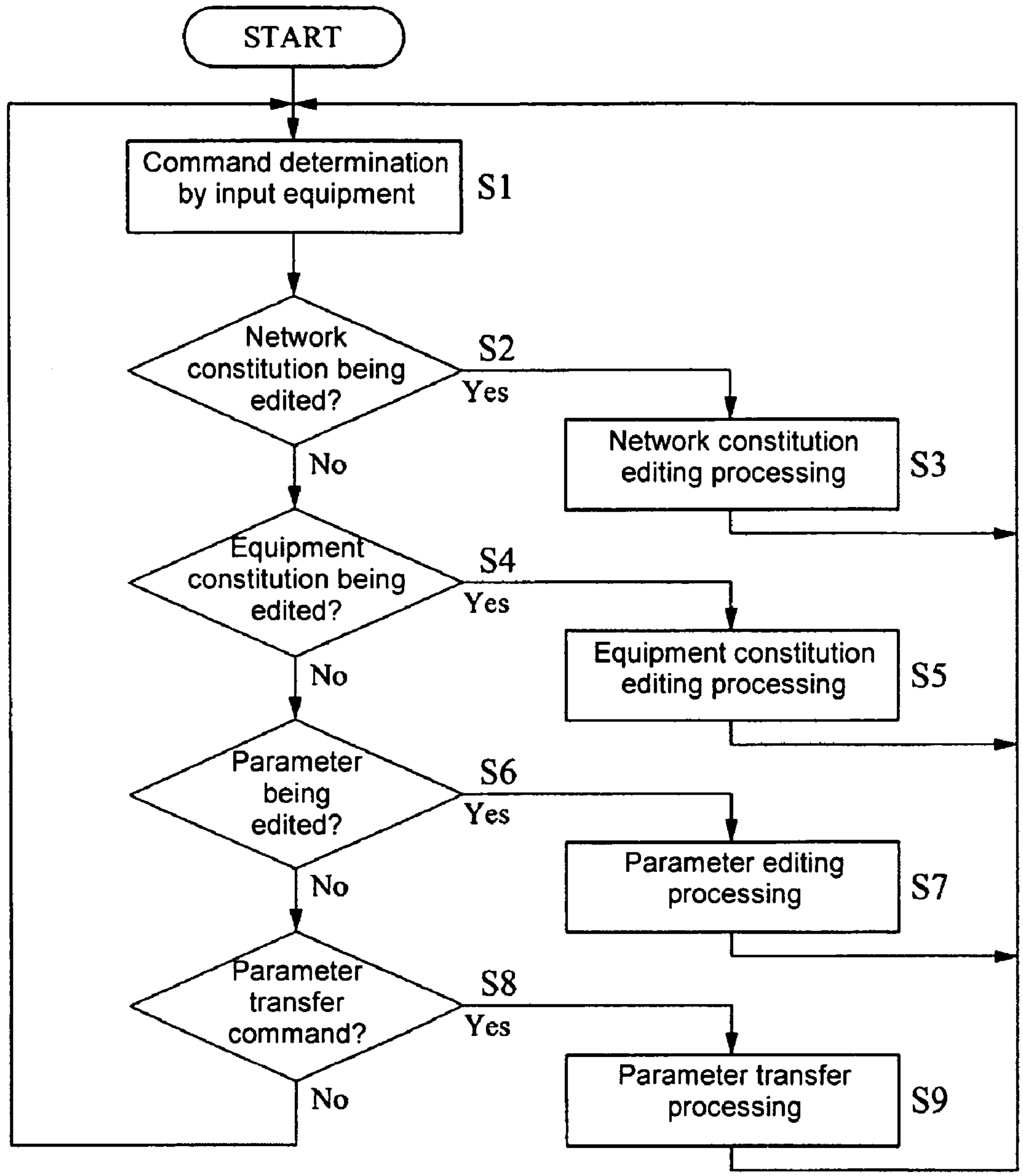
FIG. 15 shows a flowchart showing an action of a setting program.

FIG. 15 conceptually shows an overall flowchart of a setting program. This overall flowchart is primarily executed by the GUI framework 31. A detailed processing will be described as follows. First, a command, input from the input device such as the keyboard 26 or the pointing device 27, is accepted and the description thereof is checked for determination (S1).

When the determination result in S1 is that a network construction is being edited, then the branch judgment is "Yes" in the processing step S2 so that a network construction edition process is executed (S3). The network constitution edition process (S3) is executed by the network constitution editor 33 and the component list 32. One example of specific processing will be described later using FIG. 17.

When the determination result in S1 is that the network construction is not being edited, then the branch judgment is "No" in the processing step S2. In the next step, the processing step S4 jumped from the processing step S2, whether an equipment constitution is being edited or not is determined. When the equipment constitution is being edited, then the branch judgment is "Yes" in the processing step S4 so that an equipment constitution edition process is executed (S5). This equipment constitution element process (S5) is executed by the equipment constitution editor 34. One example of specific processing will be described later using FIG. 18.

When it is determined that the equipment construction is not being edited, then the branch judgment is "No" in the processing step S4. In the next step, the processing step S6 jumped from the processing step S4, whether a parameter is being edited or not is determined. When the parameter is being edited, then the branch judgment is "Yes" in the processing step S6 so that an equipment constitution edition process is executed (S7) This parameter edition process (S7) is executed by the parameter editor 35. One example of specific processing will be described later using FIG. 19.

When it is determined that a parameter is not being edited, then the branch judgment is "No" in the processing step S6. In the next step, the processing step S8 jumped from the processing step S6, whether the command is a parameter transfer command or not is determined. When it is a parameter transfer command, then the branch judgment is "Yes" in the processing step S8 so that the parameter transfer process is executed (S9).

The parameter transfer process comprises a writing process and a reading process. The parameter transfer (writing) process is executed such that the parameter editor 35 gives an instruction to the transfer 36 for writing of a parameter on a component, and the transfer 36 then gives an instruction to the messenger 37 according to a communication flow programmed in the transfer 36. The messenger 37 reads a parameter value with reference to the repository DB as necessary, and converts the parameter value into a communication command to send the parameter value to a component through the communication middleware 38.

The parameter transfer (reading) process is executed such that the parameter editor 35 gives to the transfer 36 an instruction for reading of a parameter on a component, and the transfer 36 then gives an instruction to the messenger 37 according to a communication flow programmed in the transfer 36. The messenger 37 sends a communication command concerning reading of the parameter to receive a parameter value, and converts the received value according to a CPS, to be stored in the repository DB 41.

When the determination result is that the command is not a parameter transfer command, then the branch judgment is "No" in the processing step S8, and the processing step to be executed is thereby shifted from S8 back to S1, where another input of a command in input device is waited for. Each processing step (S3, S5, S7, S9) to be executed back to S1 where another input of command input device is waited for.

The branch judgment is made to the questions including "Network constitution being edited?" in the processing steps S2, S4, S6 and S8 based on the state of the operation performed by the operator using input device (e.g. which window is active, what kind of operation has been performed).

Figure 16:
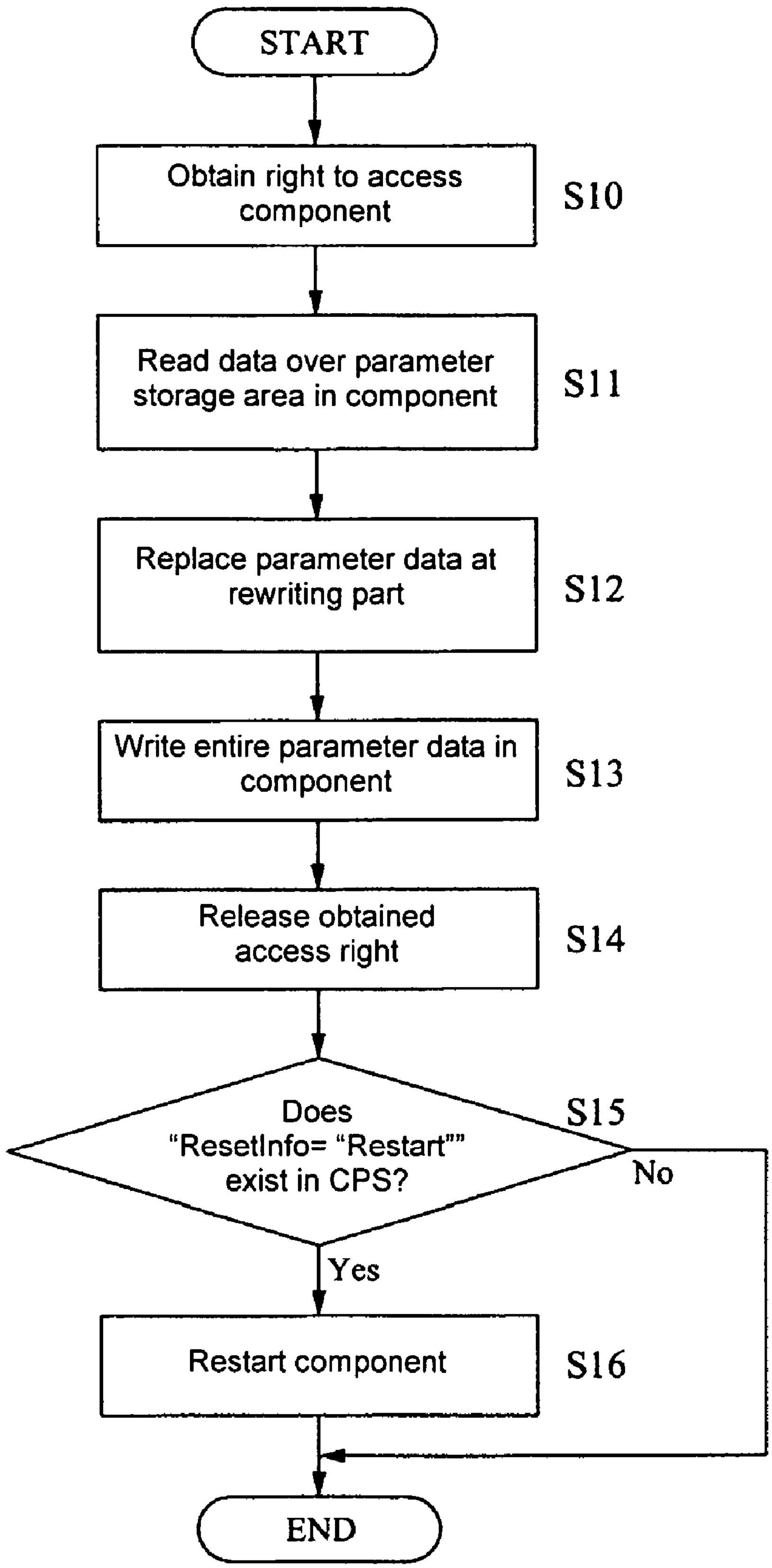
FIG. 16 shows a flowchart showing a function of communication flow programmed in a transfer.

FIG. 16 is one example of the flowchart of the communication flow programmed in the transfer 36. This flowchart can achieve the function of changing parameter data set in a component. This communication flow programmed in the transfer 36 is activated in a state where the control system setting apparatus 20 is connected to a component to be set directly or through a network to be communicable thereto.

First, the transfer 36 obtains a right to access a component to be set (S10), and then accesses that component, to read data over the parameter storage area stored in the component (S11). Subsequently, the transfer 36 replaces the parameter data at the rewriting part of the obtained data over the parameter storage area (S12). Thereafter, the transfer 36 executes the processing step S12, and writes the entire parameter data, with the rewriting part replaced, in the component to be set (S13), and then releases the obtained access right (S14).

"ResetInfo="Restart"" is set in a CPS of a component needed to restart so that the rewritten parameter can be reflected on an operation of the component. After releasing the access right, the transfer 36 determines the presence or absence of "ResetInfo="Restart"" in the CPS (S15). When "Restart" exists in the CRS (the branch judgment in S15 is "Yes"), a restart command is sent to the component so that the component restarts (S16). Execution of this communication flow enables prevention of troubles that occur due to failure of restart after transfer of a parameter.

The most basic feature of this restart function of the control system setting apparatus 20 is to send a restart command to a component after sending set data on the component to the component. This restart function can be widely performed in the setting program for setting a control system in general, including a special tool for setting a specific network or component. Namely, performance of this restart function may not necessitate any one or all of the following processes: access by a setting program to component profile data; checking for adaptability between a network and a component; and display of a network constitution diagram. In order to implement this restart function, however, it is preferable that the setting program use component profile data to determine whether the restart is necessary or not, and send a restart command only to a component needed to restart.

Figure 17:
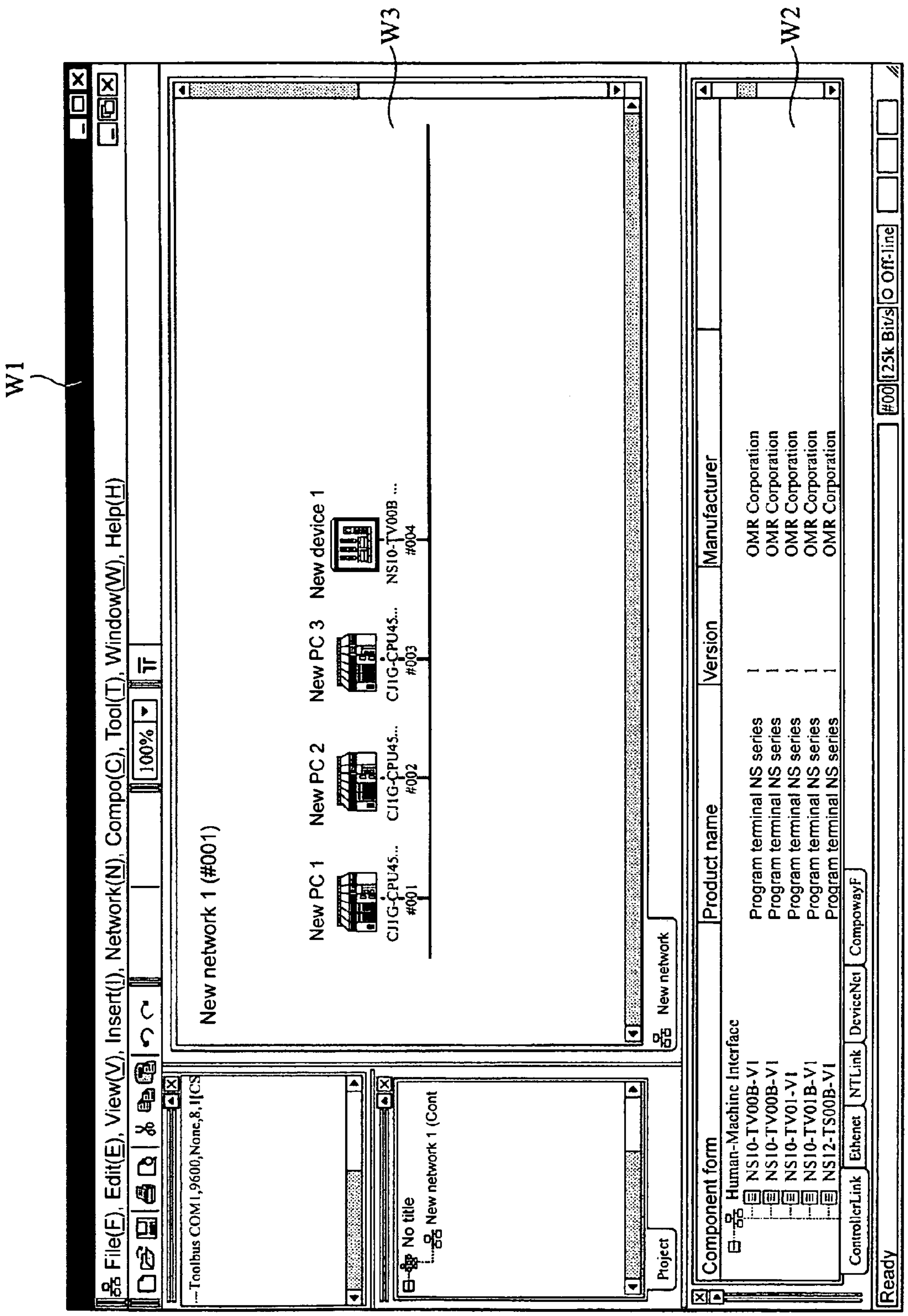
FIG. 17 shows one example of a display screen for explaining an action.

FIG. 17 shows a window W1 of the GUI framework 31, displayed with a window W3 of the network constitution editor 33 and a window W2 of the component list 32 inserted therein. Upon activation of a setting program, the window W1 of the GUI framework 31 is displayed. Immediately after the activation, this window is displayed with the window W3 of the network constitution editor 33 and a window W2 of the component list 32 inserted therein. The window W3 of the network constitution editor 33 displays a network constitution.

Addition of Network

When the operator gives an instruction for addition of a new network by a menu operation (when the branch judgment is "Yes" in the processing step S2 in FIG. 15), the GUI framework 31 opens a new window displaying a list of networks, CPS files 43 of which are registered in the CPS list of DB 42. When the operator selects a requested for from the displayed network list, the GUI framework 31 reads a CPS of the selected network, and gives the CPS to the network constitution editor 33. The network constitution editor 33 displays a network icon according to the description of the received CPS in the network constitution diagram. Further, the network constitution editor 33 can edit information on the network displayed on the network constitution diagram.

The network constitution editor 33 displays this network icon in the network constitution diagram, leading to addition of a new network. The information on the network added and edited is registered in a network folder of a project of the repository DB 41. The descriptions of the information to be registered are the name of the network, a network number, and a file name of a corresponding CPS. Herein, the network name and the network number are input by the operator, or may be produced automatically by the network constitution editor 33. The network name and the network number input or automatically produced as thus described are displayed on the network constitution diagram.

The control system setting apparatus 20 can handle a plurality of networks since it can comprise a plurality of CPSs of networks.

Addition of Component

On each tab in the lower part of the window W2 of the component list 32, names of networks, where a CPS file is registered in the CPS list DB 42, are displayed. Only the network name selected by the foregoing operation for addition of a new network may be displayed on each tab.

The component list 32 refers the CPS list DB 42 and the CPS 43 to specify a component connectable to the network designated by selection of a tab, and displays a list of those specified components. The operator selects a requested component for from the component list 32 displayed on the window W2, and drags and drops the requested component into the window W3 for the network constitution editor 33 so that a component icon can be disposed on the network icon.

Whether the component is connectable to a selected network or not can be found by checking "AttachableNetworkName" element (cf. FIG. 9) in a CPS of a component. For example, when "Network" element in a CPS of a target network is <NetworkNetworkNamte="ControllerLink" (the rest is omitted)/>, the component list 32 searches components where "AttachableNetworkName Name="N_01" NetworkName="ControllerLink"/> exists in the CPS thereof, and then displays a list of components found in the search.

A CPS of a component is selected by the operator from the component list 32, to be specified. The specified CPS is disposed in the window W3 of the network constitution editor 33 by the drag and drop operation, to be given to the network constitution editor 33. The network constitution editor 33 reads information on "AttachableNetworkName" element from the input CPS to determine whether the component is connectable to the target network or not. When it is determined that the component is not connectable, such determination is displayed. The branch judgment on connection between a network and a component is made also in the network constitution editor 33 because a component could be dragged and dropped or input from a source other than the component list 32, such as another window.

As thus described, it is convenient to previously select a component connectable to a target network from the component list 32. However, it is possible to prevent preparation of data on a network constitution where a component and a network are not adaptable to each other, merely by the alternative judgment by the network constitution editor 33.

Further, the number of mater type components in a master and slave network is checked by the network constitution editor 33. For example, since the network constitution editor 33 can recognize, from the CPS (the kind of network: "Compoway/F") of the network in FIG. 13, that this network is connected with only one master type component (e.g. the component having a CPS in FIG. 9), when more than one master type component is attempted to be connected to the network, an error message is displayed and such connection is not achieved.

When the component is connectable to the network, the network constitution editor 33 requests of the operator for inputting the component name and the number of nodes. With the number of nodes input, the network constitution editor 33 checks whether the input number of nodes does not exceed the maximum number of nodes written on "MaxNumber of nodes" in "network" element in the CPS of the network. When the checking result shows that the input number of nodes does not exceed the maximum number of nodes, component icons of the component are disposed in the network constitution diagram, and connected to the network.

Information on edited components is registered in an equipment folder of a project of the repository DB41. The descriptions of the registered information are the name of the component, a component number, a component type and a file name of a corresponding CPS.

The edited number of nodes is also registered in the project. The component name, the component number and the number of nodes are input by the operator, or may be automatically produced by the network constitution editor 33. The component name, number and type, as well as the number of nodes are displayed on the network constitution diagram (part thereof is omitted in FIG. 17). Further, linking information between the information on the component and the information on the node to which the component is connected is made and registered in the project. The number of components connected to one network can be found by searching the linking network.

Edition of Equipment Constitution (One Example of Equipment Constitution Edition Process (S5) in FIG. 15).

Figure 18:
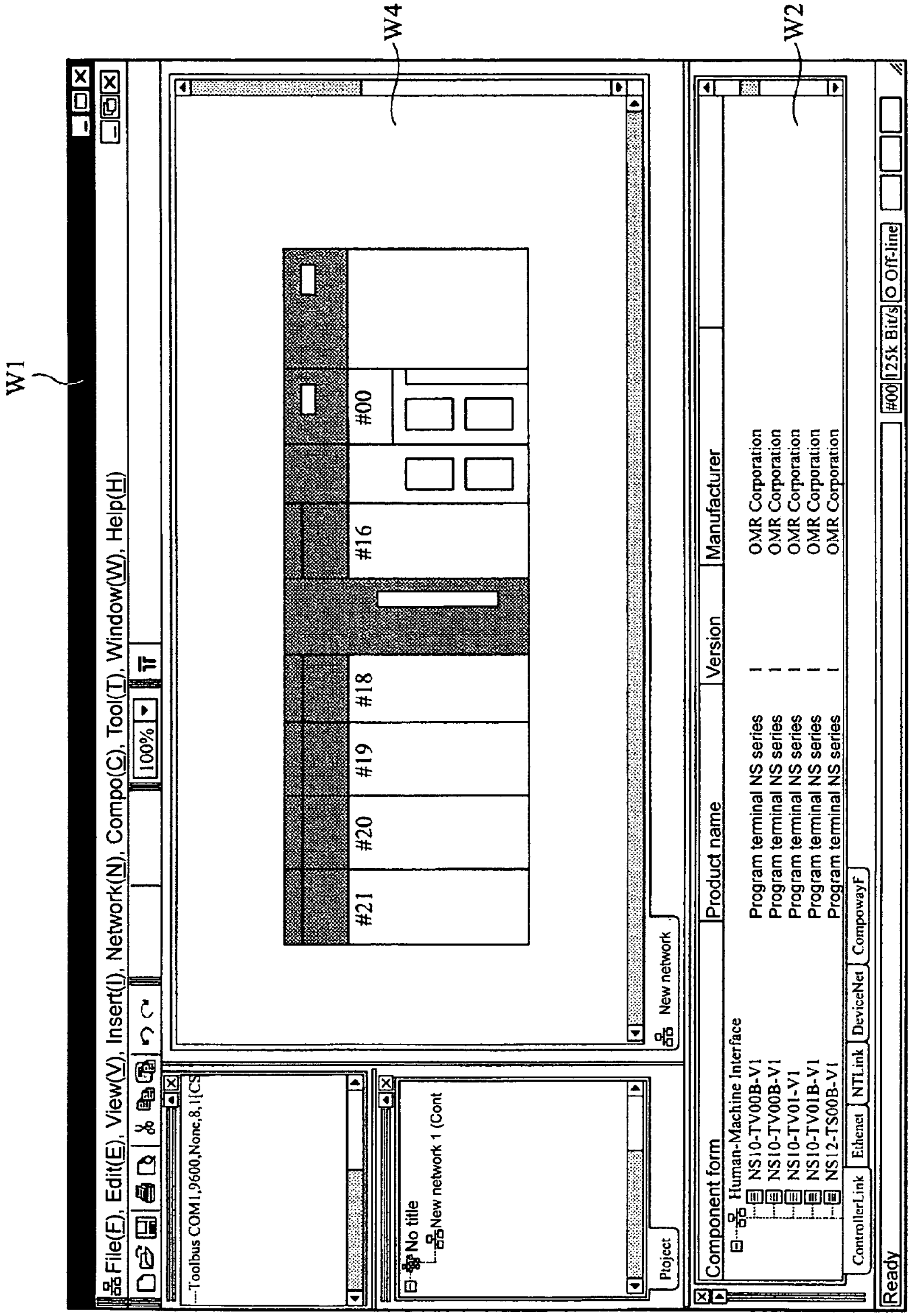
FIG. 18 shows one example of a display screen for explaining an action.

FIG. 18 shows a window W1 of the GUI framework 31, displayed with a window W4 of the equipment constitution editor 34 and a window W2 of the component list 32 inserted therein.

In the case where the operator performs a prescribed operation (e.g. double-click of an icon) accompanied by selection of a component on the network constitution diagram, the equipment constitution editor 34 is activated when "EquipmentType" defined in "Component" element in the CPS of the selected component is "BuildingBlock". The equipment constitution editor 34 displays a constitution diagram of equipment including the selected component. Also on the equipment constitution diagram displayed by the equipment constitution editor 34, a component icon can be added in the same manner as described concerning the network constitution editor.

The information on the edited equipment constitution is registered in the repository DB. The descriptions of the registered information are the name of the component, a component number, a component type and a file name of a corresponding CPS. The component name and number are input by the operator, or may be automatically produced by the equipment constitution editor. The component name, number and type are displayed on the equipment constitution diagram (part thereof is omitted in FIG. 18). Each of the information on the component is registered as a child of equipment (component group) so that which component exists in certain equipment can be found.

Edition of Parameter (One Example of Parameter Edition Process (S7) in FIG. 15).

Figure 19:
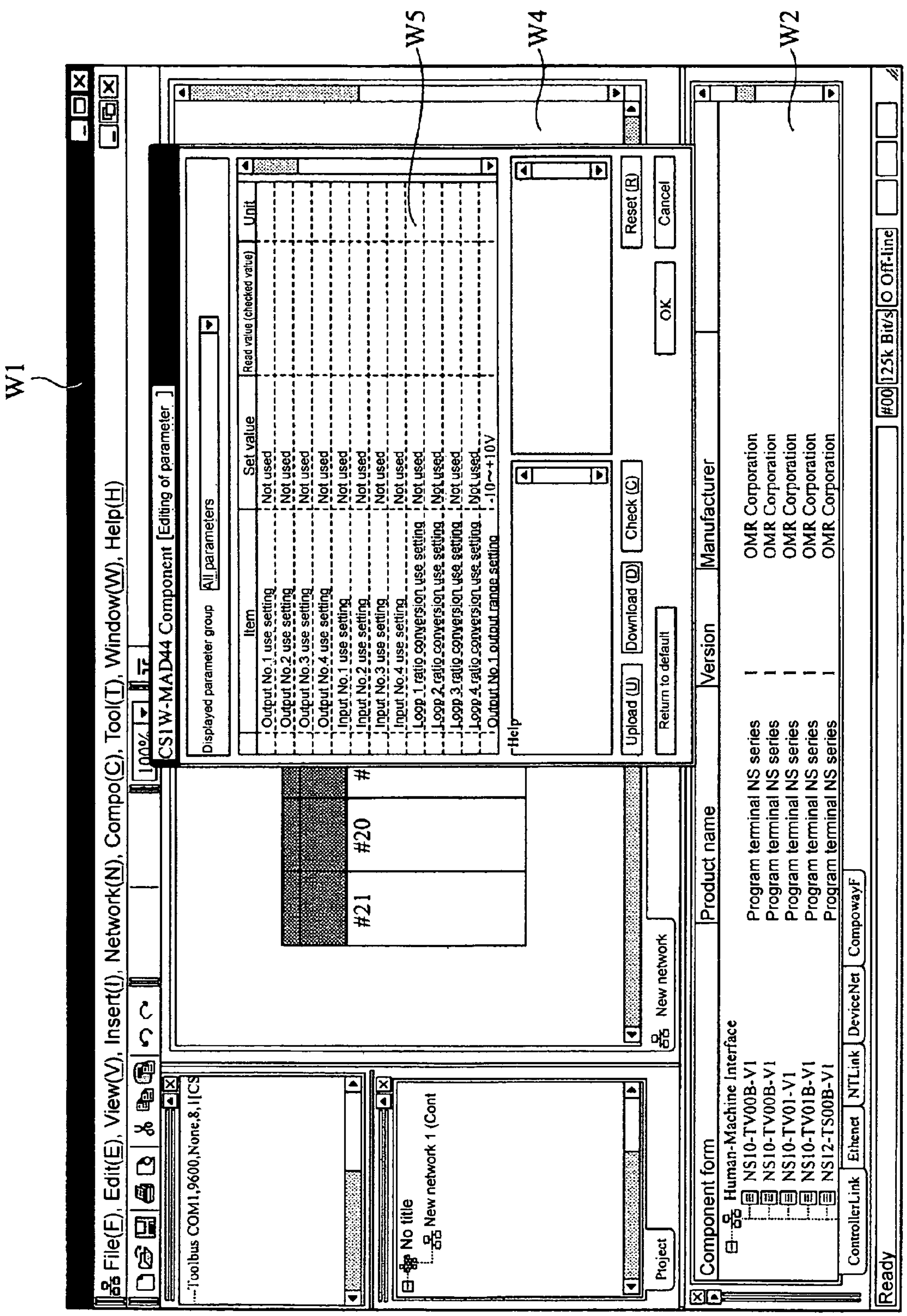
FIG. 19 shows one example of a display screen for explaining an action.

FIG. 19 shows a window of the parameter editor, which is opened, being placed on the window of the GUI framework.

In the case where the operator performs a prescribed operation (e.g. double-crick of a component icon or a network icon) accompanied by selection of a component or a network, the parameter editor 35 is activated when the CPS of the selected component or network has "Parameters" element. However, equipment editor is activated when BuildingBlock component is selected on the network block diagram.

The parameter editor 35 displays a setting screen window where a parameter value of the selected component can be edited according to the information of "Parameters" element. Upon opening of the setting screen window, each parameter may be made blank to be newly input by the operator, or a default value of each parameter may be displayed so that the operator can correct the place needed to be corrected. Further, upon or before opening of the setting screen window, a parameter value set for each component may be received from the corresponding component so that the operator can correct the part needed to be corrected. In this case, at least part of the received setting data (parameter value) is replaced with data input by the operator, thereby creating updated setting data. The edited parameter value is registered as a child data of the component in the repository DB as shown in FIG. 5.

As described concerning FIG. 12, when a name of a special tool is designated in "Application" element as the child element of "AddOnFunctions" element in the CPS of the selected component or network, the special tool can be activated to edit a parameter.

In the case of a component or network requiring a complex design, the use of a tool (program) having a plenty of support functions developed specifically for that complex design enables effective development and setting operation of a control system. The operator can choose either a parameter editor included in the setting program of this embodiment or the special tool.

Checking of Component Type

In communication with a component, the control system setting apparatus 20 confirms that a component existent in the network constitution data is consistent with the actual component to communicate with, in order to prevent transfer of a parameter value to a wrong component.

For such confirmation, "CompoNotificationInfo" element (cf. FIG. 9) in a CPS of a component is used. First, the network constitution editor 33 gives an instruction to the messenger 37 for checking of the component type. The messenger 37 reads from the CPS of the target component "CompoNotificationInfo" element, and when the description thereof is for example "SourceData="UnitProfile_CPU"" (meaning obtaining the component type information from a unit profile (code corresponding to a component type) in a CPU unit, a communication command corresponding to "UnitProfile_CPU", to send the command to the actual component.

A returned value from this component of the communication command is compared with a value defined in "DestinationData" element ("0xE01B" in the case of FIG. 9). When the two values are consistent with each other, the two component types are considered as consistent, and then the next process is executed; when the two values are inconsistent, the two component types are considered as different and an error is reported to the operator.

The type checking function of the control system setting apparatus 20 can be described as follows. The type checking function checks whether: component profile data includes information corresponding to the component type; a setting program obtains information corresponding to the component type from the component to communicate with; and the obtained information corresponding to the component type is consistent with information corresponding to the component type included in the profile data of the component. This type checking function can be performed even in the case where a setting program has either/neither the function of checking for adaptability between a network and a component or/nor the function of displaying a network constitution diagram.

Transfer of Component Parameter

When the operator gives an instruction for transfer of a component parameter from a control system setting apparatus to a component, the parameter editor reads IDs of the transfer 36 and the messenger 37, which have been written in "ExchangeableComObject" element in a corresponding CPS. Thereafter, those two programs are read from the hard disc of the control system setting apparatus 20 into the memory 22, and activated to execute transfer of a parameter (S9 in FIG. 15) as described above by reference to FIG. 15.

Plural kinds of transfers 36 and messengers 37 can respectively exist in the setting program, and the transfer 36 and the messenger 37 that are selected according to the description of the CPS of the component as above described are used.

In the present embodiment, the present invention is implemented using the control system setting apparatus 20 as one computer storing profile data in the storage device thereof. However, the present invention is not limited thereto. Profile data may be stored in a remote server computer or the like, to be accessed from a computer as the control system setting apparatus 20 through a local area network, the Internet, a private line, or the like.

Further, a control system setting apparatus may be constituted of a computer system composed of a computer to be connected to a control system and one or more computers communicating with this computer so that the operator performs an operation using input device and a display provided on any one of the computers and a setting program is executed on any one of the computers. In this case, the computer on which the operator performs an operation and the computer on which the setting program is executed may be either the same or different. Moreover, execution of the setting program may be distributed to a plurality of computers.

According to the control system setting apparatus of the present embodiment, it is possible for a designer or a setting operator of a control system to integratedly handle plural kinds of networks and components corresponding to those networks in designing, starting-up (starting operation of), changing and maintaining the control system, thereby giving high operation efficiency.

Figure 20:
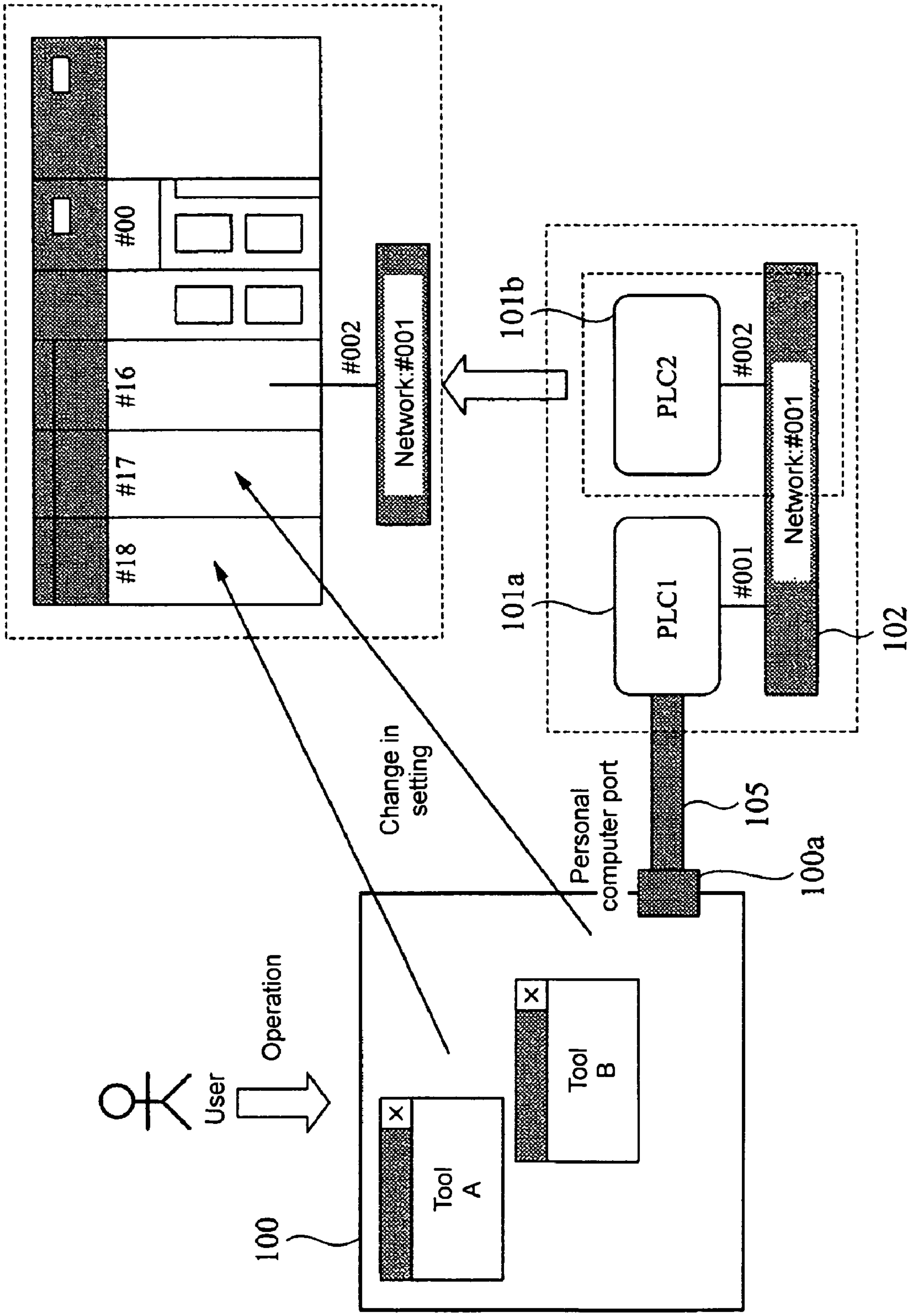
FIG. 20 shows a view showing one example of a control system and a control system setting apparatus connected to the control system, to which the present invention is applied.

FIG. 20 shows one example of a state where part of a control system is connected with a control system setting apparatus 100 as another embodiment of the present invention. In this example, a first PLC 101*a* and a second PLC 101*b* are connected to a network 102 in the control system. This network 102 for example corresponds to the cell network 7 shown in FIGS. 1 and 2. Also in the present embodiment, a setting program or the like is installed into a personal computer to constitute the control system setting apparatus 100. This control system setting apparatus 100 is connected to the first PLC 101*a* through a serial line 105 connected to a port 100*a* such as RS-232C provided in the personal computer.

The second PLC 101*b* is constituted of a plurality of units as illustrated in the region pointed by the arrow and surrounded by the dotted line. Although not shown in the drawing, the first PLC 101*a* is also constituted of a plurality of units. The first PLC 101*a* and the second PLC 101*b* separately constitute equipment, and the units constitute components. When a variety of settings are made to the network 102 and components, a setting tool (setting program) is used. The setting tool to be used in the present embodiment is prepared for each kind of network to be set, as well as each kind of components to be set. In FIG. 20, a special tool A is a tool for a unit #18 constituting the second PLC 101*b*, while a special tool B is a tool for a unit #17 constituting the second PLC 101*b*. Those pluralities of special tools are installed in the control system setting apparatus 100.

The control system setting apparatus 100 can access each component (unit) constituting the second PLC 101*b* through the network 102, not to mention each component (unit) constituting the PLC 101*a*, to which the control system setting apparatus is directly connected. Namely, in making setting to each unit of the second PLC 101*b* with the use of the tools A and B, the control system setting apparatus 100 communicates with a prescribed unit of the second PLC 101*b* from the first PLC 101*a* through the network 102.

Figure 21:
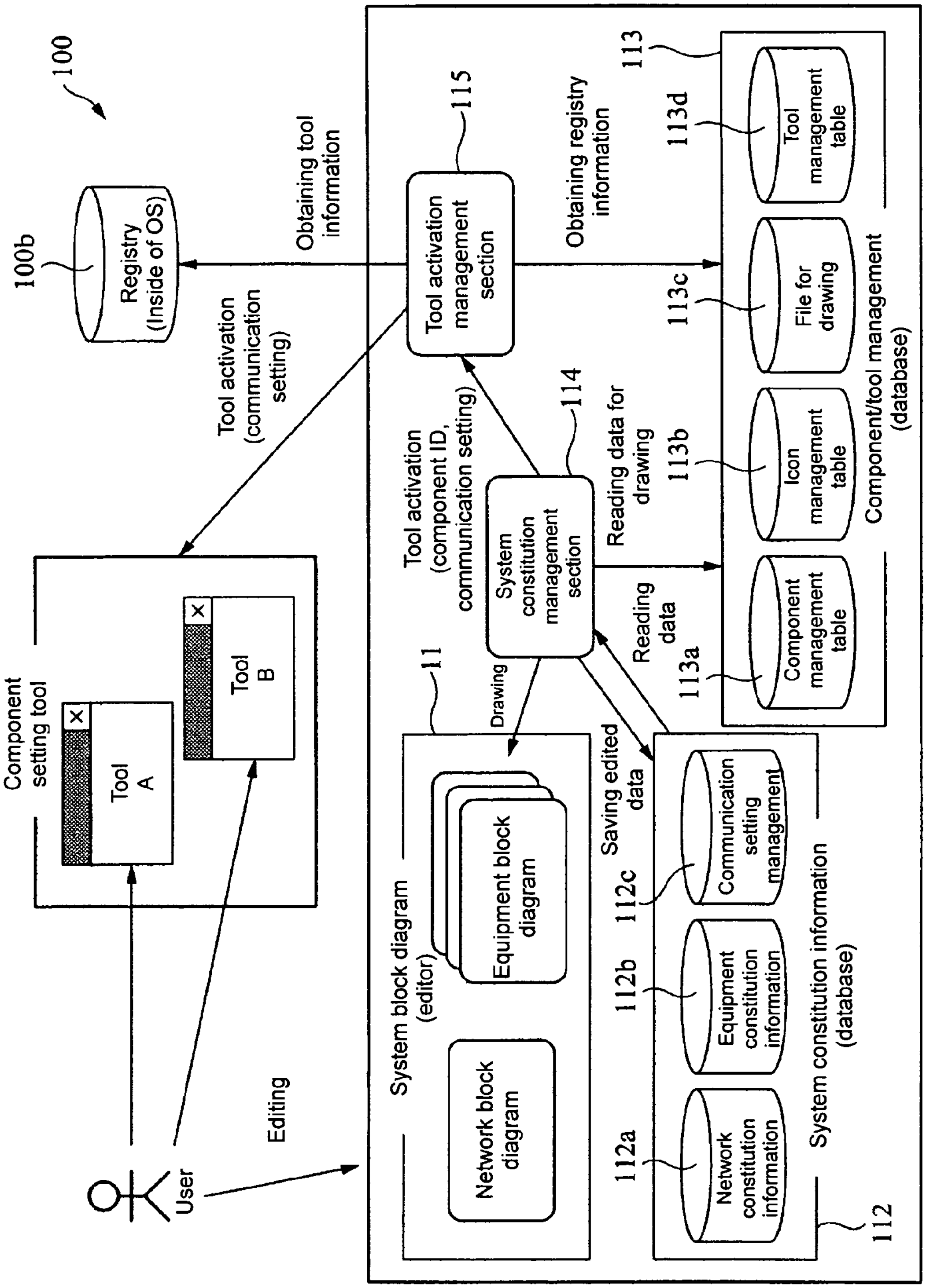
FIG. 21 shows a view showing one embodiment of a control system setting apparatus according to the present invention.

FIG. 21 shows one embodiment of the control system setting apparatus 100. This control system setting apparatus 100 comprises a system block diagram edition display section (editor) 111, a system constitution information database 112, a component/tool management database 113, a system constitution management section 114, and a tool activation management section 115. The application program parts of the system constitution management section 114, the system block diagram edition display section (editor) 111 and the tool activation management section 115 constitute the setting program.

Figure 22:
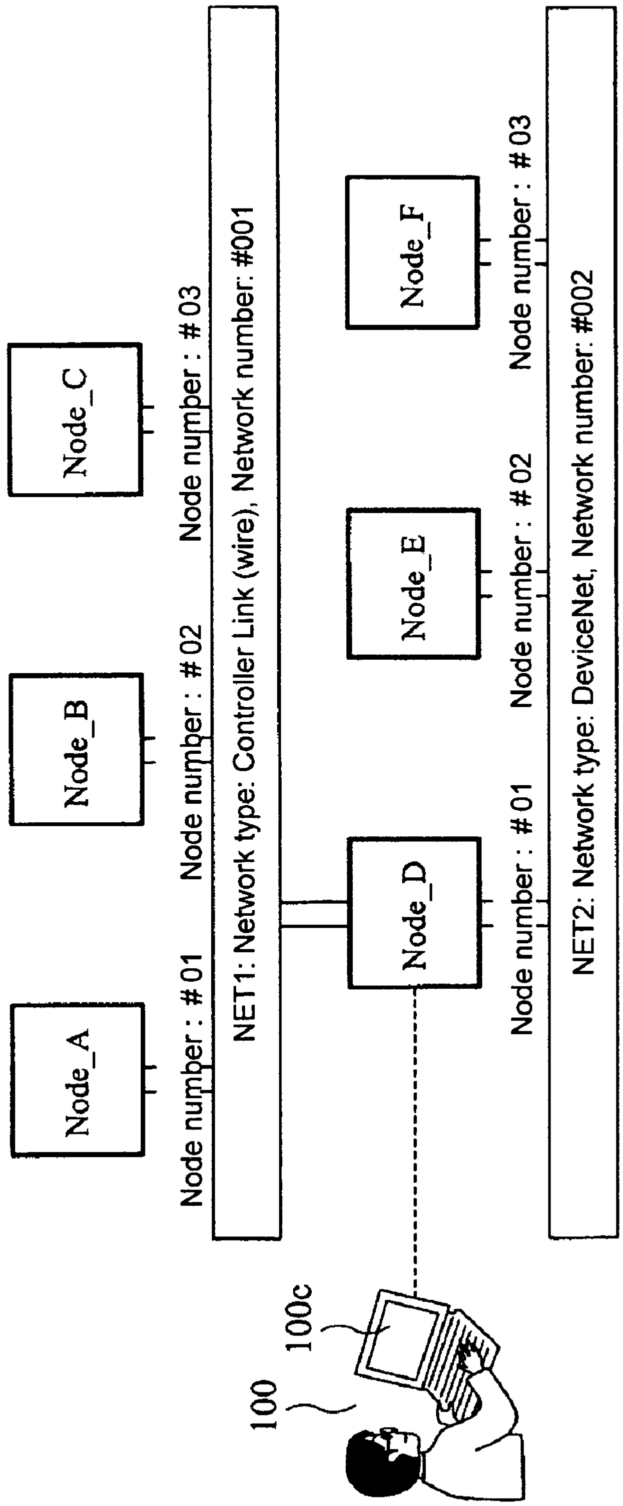
FIG. 22 shows a view showing one example of a system block diagram.

A system block diagram displayed by a display screen (not shown in FIG. 21) of the display of the control system setting apparatus 100 comprises a network block diagram and an equipment block diagram. FIG. 22 shows an image screen picture when the network block diagram is displayed on a display screen (window) of the display 100 *c* of the control system setting apparatus 100. Herein, however, the pictures of the operator and the personal computer are not displayed on the screen. The picture of the control system setting apparatus (laptop personal computer) 100 is placed in FIG. 22 with the aim of showing that the control system setting apparatus 100 is connected to the equipment of Node_D. A control system composed of the actual equipment (components) and the actual network has the same constitution as the network block diagram.

As shown in FIG. 22, the network block diagram consists of icons showing a plurality of networks (NET1 and NET2 in FIG. 22), and icons showing nodes (Node_A to Node_F in FIG. 22) connected to the individual networks. In FIG. 22, the network block diagram is shown by the combination of bar-shaped network icons corresponding to the networks, and rectangular component icons (equipment icons) corresponding to the nodes. When the node is a component, the icon corresponding to the node becomes a component icon comprising a graphic figure indicating the component. Meanwhile, when the node is equipment, the icon corresponding to the node becomes an equipment icon comprising a graphic figure indicating the equipment.

In each network, a unique number (network number) for identifying the network and a network type for physically identifying the kind of network are set. In each node, a unique number (number of nodes) is set, which can be identified in the network to which the node is connected. This setting may be made such that the user operates the input device of the control system setting apparatus 100 or such that the setting is automatically allocated in the order of producing nodes, based on the function of the control system setting apparatus 100. In either manner, overlapping of numbers is not allowed. With the network number and the number of nodes combined, all the nodes can be identified uniquely from the entirely network. It is to be noted that, in FIG. 20 described above, the lower-right part corresponds to the network block diagram.

Further, a node of actual equipment corresponding to each node on the screen is equipment connecting with the network. Such equipment can be classified into: (1) equipment constituted of a single component (inverter etc.); and (2) equipment constituted by combining a plurality of components (PLC etc., equipment equivalent to the first PLC 101*a* and the second PLC 101*b* shown in FIG. 20)

Components constituting equipment can designate identification information specifying the component. This identification information is used for unique identification of the component in each node. When a unit is designated in the example of the first PLC 101*a* and the second PLC 101*b* shown in FIG. 20, first, a node is uniquely specified (whether the first PLC 101*a* or the second PLC 101*b*), and based on that identification information, which unit (component) in the node is uniquely specified.

More concretely, in the above case (1) where a node is a single component, the control system setting apparatus 100 first acknowledges designation of a component icon (the rectangular part in FIG. 22) on the network block diagram shown in FIG. 22 which is displayed on the display screen of the control system setting apparatus 100 (the monitor screen of the personal computer 3), namely the control system setting apparatus 100 acknowledges performance of a click operation or the like by the user; the control system setting apparatus 100 then makes a setting screen, comprising a smaller different window, pop up on the display screen of the display 100*c*.

Figure 23:
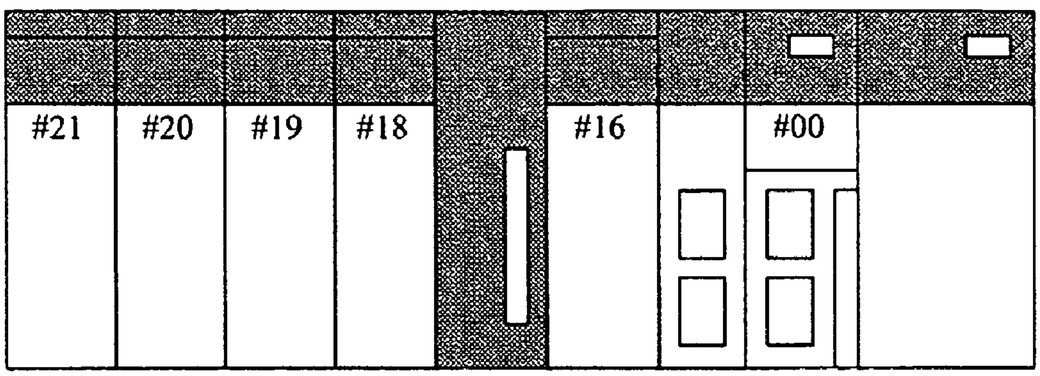
FIG. 23 is a view showing one example of an equipment block diagram.

In the above case (2) where a node is constituted by combining a plurality of components, the control system setting apparatus 100 first acknowledges designation of an equipment icon on the network block diagram shown in FIG. 22, namely performance of a click operation or the like; the control system setting apparatus 100 then makes another window pop up which displays an equipment block diagram as shown in FIG. 23 (block diagram of a PLC constituted of a plurality of each kind of units) The equipment block diagram is constituted of a plurality of unit-shaped component icons, as shown in FIG. 23. The input device of the control system setting apparatus 100 is operated to further designate a component icon corresponding to a requested component (any one of all kinds of units) on the component block diagram (performance of a click operation or the like); the control system setting apparatus 100 then makes a setting screen, comprising a smaller different window, pop up on the screen of the display 100*c*.

It should be noted that, in the above case (2) where a node is constituted by combining a plurality of components, unique numbers that can be uniquely identified in each node (component number: #00, #16 and #18 to #21 in FIG. 23) can be designated to each component (unit in the case of PLC). As in the case of designation of a number of nodes or the like, the designation of a component number may be set by manual operation or be automatically allocated based on the function of the control system setting apparatus 100. It should be noted that, in FIG. 20 described above, the upper-right part surrounded by the dotted line corresponds to the equipment block diagram.

On the control system setting apparatus 100, the user operates the system block diagram edition display section (editor) 111, to create a new system block diagram or appropriately modified system block diagram, where the user writes a network constitution and a component constitution of each node. For example, icons each for identifying a component, equipment or the like are displayed at a prescribed position of an input screen. Those icons are, for example, "Network", "Network connection" (wiring for connection between a network and a node), "Personal computer", "PLC", "Display", "General device" and "Control system setting apparatus". With those icons displayed, the user can drag and drop a requested icon into the system block diagram creating region to create a network block diagram. (Creation of this network block diagram will be described by reference to drawings later than FIG. 31)

Disposing icons in the foregoing manner, the control system setting apparatus 100 allows automatic allocation of a network number and the like to each icon. Further, selection of icons (network icon, component icon) on the network block diagram enables a special tool to make a variety of settings to a network or a component corresponding to the selected icon.

The component/tool management database 113 is used for drawing each icon, associating it with information specifying a network or a component, and also used for activation of a special tool to set a component to correspond to an icon in the network block diagram. The component/tool management database 113 manages static information, which is not changed associated with creation or change of a network block diagram or the like. Specifically, the component/tool management database 113 comprises: a component management table 113*a* for storing information on each kind of component; an icon management table 113*b* for storing information on an icon to be displayed on a display screen; a section 113*c* for storing a file for drawing, for controlling a graphic figure to be actually displayed; and a tool management table 113*d* for managing a special tool for each component.

FIG. 24 shows the table structure of the component management table 113*a*. The component management table 113*a* relates the following: a component ID for specifying a component to be part of a control system; a component type specified by the component ID; a component version; a setting tool ID for specifying a special tool to make setting to the component; a name of a file for drawing, for specifying an image data (icon: the shapes of a network icon, a component icon, etc.) to draw the component on the display screen of the control system setting apparatus 100; and a size of drawing displayed on the display screen after reading of data specified by the name of a file for drawing. In FIG. 24, the same setting tool IDs are related to different two types of components because, in some cases, even different types of components use a common special tool. The name of a file for drawing is a name of a file stored in the section 113*c* for storing a file for drawing. In the case where a component specified by a component ID is displayed by a component icon, drawing data (image data) having the corresponding name of a file for drawing is invoked while being displayed on the display screen. Since this component management table 113*a* shows a drawing size, for example, the system constitution management section 114 can make accurate relative-positioning among component icons even when each component is a unit constituting a PLC and an equipment block diagram of a node (PLC) constituted by linking a plurality of components (cf. FIG. 23) is displayed. This permits a display in a state where component icons are neither overlapped nor separated, but are neatly linked in the vertical and horizontal directions.

FIG. 25 shows the table structure of the icon management table 113*b*. The icon management table 113*b* relates the following: a type ID, a component type indicated by the type ID; a setting tool ID for specifying a tool to be used; and a name of a file for drawing, concerning image data of the icon stored in the section 113*c* for storing a file for drawing.

The section 113*c* for storing a file for drawing stores data including a network icon and an icon of each component. Further, the tool management table 113*d* stores information for invoking a corresponding special tool from specified component IDs and the like, based on a component icon selected by the user. Specifically, it has a table structure as shown in FIG. 26. Namely, the tool management table 113*d* relates the following: a setting tool ID ("tool ID" in FIG. 26) for specifying a special tool to be used; a tool name; a tool version; and a registry path for specifying an area where the special tool is stored. Herein, the registry path indicates a place storing information on installation of each special tool (the tools A and B shown in FIGS. 20 and 21) registered in the operating system of the personal computer constituting the control system setting apparatus 100, and other information. When each special tool is installed in the control system setting apparatus 100 (personal computer), already existent installation information (place of installment, a name of a file to be executed, etc.) is registered in a registry 100*b*. Hence the tool activation management section 115 of the control system setting apparatus 100 can access (activate) a special tool after obtaining information on a place to install the special tool and a name of a file to be executed, based on the registry path information.

It should be noted that a tool named: CX-Programmer, is a special tool for a PLC, having the functions of creating a user program, setting a PLC mode, and monitoring IO data and an operation status of a PLC. A tool named: CX-Motion, is a special tool for a positioning control equipment and a PLC motion unit (also referred to as a MC unit), having the functions of creating a system parameter of a motion control, a positioning data and a MC program, and monitoring an operation status of an MC unit. A tool named: CX-Protocol, is a special tool for setting concerning communication. A tool named: NS-Designer, is a special tool for setting concerning a programmable display, having the functions of forming a screen of a programmable display and making setting of a touch panel switch on a display screen. A tool named: network monitor, is a special tool for setting of monitor equipment that monitors a signal flowing in the network.

Next, the system constitution information database 112 will be described blow. The system constitution information database 112 manages dynamic information, which is changed associated with creation or change of a network block diagram or the like by the user, and comprises: a network constitution information database 112*a*; an equipment constitution information database 112*b*; and a communication setting management database 112*c*.

Based on a network block diagram created by the user, the network constitution information database 112*a* has information for specifying a node and a network existent in the network block diagram. Specifically, as shown in FIG. 27, this table relates the following: an ID, an icon type, a name, a rectangular coordinate, and a network/number of nodes.

Herein, the ID uniquely exists in the network block diagram, and is allocated the combination of a network and a node. Further, the ID also serves as a network ID for specifying a network drawn on the network block diagram, or as a component ID for specifying a component to be part of the system constitution. It is to be noted that, as for one component, the ID (component ID) in the network constitution information database 112*a* is consistent with the component ID in the component management table 113*a*. Further, “Type” in the network constitution information database 112*a* is consistent with “Type-ID” in the network icon management table 113*b*.

The name is that of a network or a node, and registered by the user. In the example of FIG. 22, the names “NET1” and “NET2” are set for the networks, and the names “Node_A” to “Node_F” are set for the nodes.

The rectangular coordinate is coordinate information for displaying each icon (component icon, network icon, etc.). A coordinate of a position to display each icon on a display screen, indicating a standard position (e.g. the upper left of each icon) on the display screen, is registered. It is to be noted that, in the case of the network icon where the length thereof is undefined, for example, position coordinates of both ends of the network icon are registered.

The network/number of nodes (net/number of nodes) is an address for specifying each node on the control system (network block diagram). This address for specifying a node is formed by relating an ID of a network (network number) to which the node is connected, to the number of nodes of the node in the network. When a node is for example connected to a plurality of networks, such as Node_ID, each network ID and a number of nodes are written side by side to be stored. As described above, the network constitution information database 112*a* registers network information as well as node information. The number of nodes of the network is set to 0 (#00). With the space for the net/number of nodes filled with “Network No.-#00”, the network information can also be registered.

The equipment constitution information database 112*b* manages each equipment block diagram for an icon (equipment icon) of a node constituted by combining a plurality of components in the network block diagram, and the specific data structure thereof is shown in FIG. 28. In the table of FIG. 28, equipment constitution information concerning each one node is shown. This information is constituted of the table relating the following: a component type to be drawn, a drawing position (coordinate information), and a component ID (ID of a component icon).

The coordinate information registers the coordinate position of the upper left of each component icon. In drawing each component icon, the system constitution management section 114 searches a name of a file for drawing corresponding to the component ID from the component management table 113*a*. Based on the result of the search, the system constitution management section 114 accesses the section 113*c* for storing a file for drawing to pass the searched file to the system block diagram edition display section (editor) 111. The system block diagram edition display section (editor) 111 thereby displays the drawing of an equipment block diagram, as shown in FIG. 29 for example, at a position designated by the coordinate information on the window of the display of the control system setting apparatus 100.

As described above, this equipment constitution information database 112*b* corresponds to each equipment icon of a node constituted by combining a plurality of components in the network block diagram, and has each piece of equipment constitution information as one table. Each table has identification information (ID, file name, etc.) for identifying an equipment icon to correspond to. This identification information is desirably related to an equipment icon ID.

This will be explained by reference to FIG. 20. In FIG. 20, there is one table corresponding to the equipment icon of the second PLC 101*b*, and there is another table corresponding to the equipment icon of the first PLC 101*a* (not shown). The table shown in FIG. 28 corresponds to the equipment icon of the second PLC 101*b*. This can also be understood from the fact that the unit constitution of the second PLC 101*b* shown on the upper right of FIG. 20 is the same as the unit constitution shown in FIG. 29.

Figure 29:
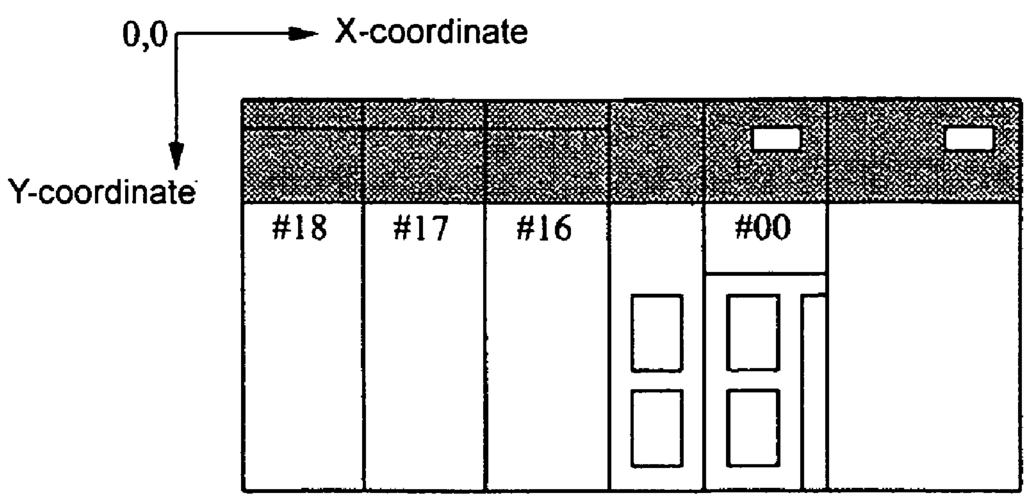
FIG. 29 shows a view for explaining a drawing of an equipment structure block diagram.

This equipment constitution information database 112*b* is accessed by the system constitution management section 114, which then reads necessary image data (file for drawing) to display an equipment block diagram, as shown in FIG. 29, at a requested position.

As for those network block diagram information and equipment block diagram information, when the user operates the system block diagram edition display section 111 to add or delete a node (equipment, component) or a network, or change information incidental to the node or the network, the system constitution management section 114 recognizes such an operation by the user, to update data stored in the system constitution information database 112.

Coordinate information in the equipment block diagram information and a drawing size in the component management table specify a region in which each component exists on a display screen. For this reason, when the user clicks a unit component on the display screen, the control system setting apparatus 100 (system constitution management section 114) compares the clicked coordinate and the coordinate information of each component so as to identify which component image has been clicked. Similarly, since a region in which each icon exists can be specified from the network block diagram information, the control system setting apparatus 100 (system constitution management section 114) can recognize which node icon (equipment icon, component icon) or which network icon (bar-shaped icon) has been clicked and designated.

After designating unique information and number of each network and node so as to identify the network and node respectively displayed on the network block diagram and the equipment block diagram, the user realizes the same constitution as the block diagram, using actual equipment. Namely, the user prepares for equipment having the same constitution as drawn in the equipment block diagram, and operates a rotary switch, with which the equipment is provided with for setting a number of nodes or the like, to set the same number of nodes to the actual equipment as the unique number of nodes designated in the network block diagram. Similarly, each component in the node is set to have the same unique number (serial number etc.) as the unique number designated in the equipment block diagram.

Also in the case where a plurality of pieces of equipment (components) are connected to an actual network line, those pieces of equipment (components) are made to have the same constitution as the network block diagram, and each of those equipment (components) is set to have the same unique number (number of nodes etc.) as the unique number designated in the network block diagram. This makes the relationship of the equipment and components in the network/equipment block diagrams of the control system setting apparatus 100 identical to the relationship the equipment/components in the actual control system. As another example, actual equipment/components may be previously connected to the network to have a system constitution so that the network block diagram and the equipment block diagram, having the same constitution as the above system constitution, are created using the control system setting apparatus 100.

The communication setting management database 112*c* sets and manages communication conditions of each component. The information on the communication conditions consists of two pieces of information: (1) information on a condition of communication with equipment (PLC) physically connected to the control system setting apparatus 100; and (2) information indicating a place of an object to be set (a component constituting a node, or a network itself) on the network. The control system setting apparatus 100 has one of the information (1) on the communication conditions, which can be customized by the user. More specifically, when a PLC connected with a personal computer constituting the control system setting apparatus 100 is fixed (e.g. port [COM1], communication protocol [TOOLBUS], communication speed [9600 bps]), a condition of communication with each component is determined by obtaining the information (2). The information (2) consists of a network address, a node address and a serial number, which can be obtained from the data the user input in creating a system block diagram. It is therefore possible to create a condition of communication with each component by combining the information (1) held by the control system setting apparatus 100 and the information (2).

Furthermore, in the present embodiment, all the communication conditions have been written in a letter-string format (cf. FIG. 30) In this manner, interfaces indicating communication conditions are uniformed in the letter-string format, and then passed to an application to communicate so that the letter strings can be decoded at the application side to recognize the communication conditions.

The communication conditions of FIG. 30 may be explained as follows: [DEV], [NET] and [DRVR] correspond to the information (1) above, while [ADDRESS] corresponds to the information (2) above. DEV, CPU, NET, PORT, DNA, DA1 and DA20 are parameters. Data described following each parameter is a parameter value of the parameter. Namely, each of the values of DEV and CPU stores a component type information, the value of NET stores a communication protocol ("tool bus protocol" in the example of FIG. 30), and the value of PORT stores a port, a communication speed, etc. of the control system setting apparatus 100 (personal computer) to be used. DNA stores a network address, DA1 stores a node address, and DA2 stores a serial number. In the case of FIG. 30, the component to be communicated (to be set) is a component having the serial number 0, belonging to the node having the number of nodes #02 in the network of 001.

Next, the functions of the system constitution management section 114 and the tool activation management section 115 will be explained, while activation of a special tool and an operation of communication setting based on the foregoing constitution will be explained. On the display screen of the control system setting apparatus 100, the system block diagram thereof (a network block diagram as in FIG. 22, or an equipment block diagram as in FIG. 23) is displayed. The user clicks an icon, to be set on the system block diagram, to select the icon. This may be a node icon (an equipment icon or a component icon) or a network icon, as shown in FIG. 22. In the case of selecting an equipment icon, upon clicking of the icon, a window displaying the equipment block diagram shown in FIG. 23 is opened. Therefore, the user clicks to select an icon of a component to be set from the components constituting the equipment. In the equipment constitution database 113*b*, information on a block diagram of each equipment is stored in a table form, added with identification information. Since this identification information is made to correspond to an equipment icon, when the equipment icon is clicked as described above, the corresponding equipment block diagram is displayed.

The system constitution management section 114 accesses the network constitution information database 112*a* or the equipment constitution information database 112*b* from the coordinate position clicked, to recognize which component icon or network icon has been selected.

Once the icon is specified, a corresponding ID or component ID can be recognized. Namely, the system constitution management section 114 obtains a corresponding ID by reference to the network constitution information database 112*a* if the selected icon is a component icon or a network icon corresponding to a component connected to the network as a single component. When the selected icon is one of a plurality of components constituting the equipment, a corresponding ID is obtained by reference to the equipment constitution information database 112*b*.

Moreover, when the selected icon is to be connected to the network, the system constitution management section 114 accesses to the network concentration information database 112*a* to obtain the address of the selected component icon, and also accesses the communication setting management database 112*c* to obtain communication setting information (the foregoing information (1) and (2), as information of communication conditions). The system constitution management section 114 then passes the tool activation control section 115 the component ID and the communication setting information corresponding to the selected icons.

The tool activation management section 115 accesses the component management table 113*a* based on the obtained component ID, to obtain a corresponding tool ID. Subsequently, the tool activation management section 115 uses the obtained tool ID as a key to access the tool management table 113*d*, and then obtains a registry path where a corresponding special tool is stored. The tool activation management section 115 activates a special tool according to the information of the place of installation (storage place) and the file name of the corresponding special tool, obtained from the obtained registry path. Herein, the communication setting condition is also transferred to the special tool.

The activated special tool makes setting of a communication speed and the like at the time of communication with the actual components and the like, according to the communication setting conditions received. The setting of a communication speed and the like relates to the communication conditions (which port is used at what communication speed, etc.) at the side of the control system setting apparatus 100. Herein, the special tool may automatically make setting according to the received communication setting condition, or the received communication setting condition may be displayed as the initial condition on the display of the control system setting apparatus 100 so that the user can confirm the condition before actual setting is made. According to the communication conditions, such as a communication speed set by the special tool, the actual component connected to the control system is communicated, and the setting descriptions such as a parameter are then downloaded to a component or the like to be set, thereby completing the setting of the component or the like.

As thus described, according to the present embodiment, automatic activation of a special tool is possible when the user selects a component on a system block diagram. Moreover, according to the present embodiment, the user is allowed to input, on a network block diagram, location information that uniquely identifies a specific component on a network, such as a network number, a number of nodes, a serial number and the like. Further, the user is allowed to input setting for communication between the control system setting apparatus 100 and a control system. It has thereby become possible to automatically create communication conditions when the control system setting apparatus 100 communicates with each component.

Figure 31:
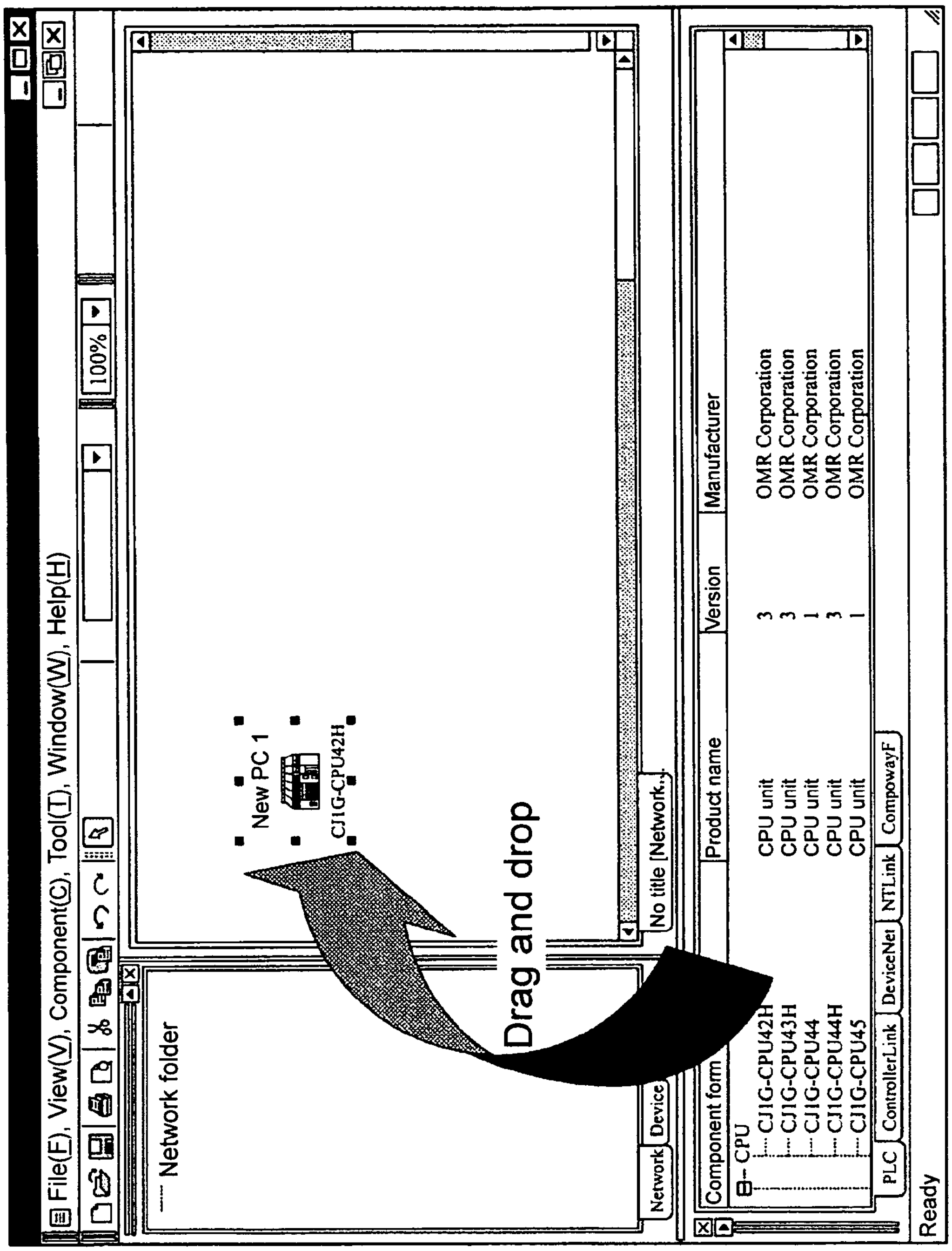
FIG. 31 shows one example of a display screen for explaining an action.

Creating a network block diagram will be described below using an actual screen image. FIG. 31 shows the display screen of the control system setting apparatus 100. In FIG. 31, at the bottom, a list display region for displaying a list of components is provided; and on the upper right, a network block diagram creation region for actually creating a network block diagram is provided, and a region tree-displaying a network constitution (connection relation) created in the network block diagram creation region is also provided. As seen from the tabs at the lower end, the list display region includes PLC (programmable controller), ControllerLink (one kind of communication network), and DeviceNet (one kind of remote IO network), and NTLink (One kind of network concerning a display) FIG. 31 shows the display of the list of PLCs, where all components usable in this PLC are listed by type. Further, when "DeviceNet" tab is selected, components suitable for (connectable to) DeviceNet are listed up by type in the list display region (cf. FIG. 34 etc.) Therefore, a list of components connectable to a PLC or a network designated by section of a tab is displayed in the list display region.

A network block diagram is created as follows. First, one component or equipment (e.g. PLC type ) is selected from those listed up in the list display region, which is then dragged and dropped into the network block diagram creation region (cf. FIG. 31) The component icons (equipment icons) displayed in the list display region have already been related to a variety of information, such as types of components/equipment corresponding to the components/equipment, based on the component/tool control database 113**. After the transfer of the component icon and the like by the drag and drop operation from the list display region into the network constitution creation region, information (type etc.) on a component corresponding to the icon, information on a special tool corresponding to the component, and other information, are related to the icon displayed in the network block diagram creation region.

Figure 32:
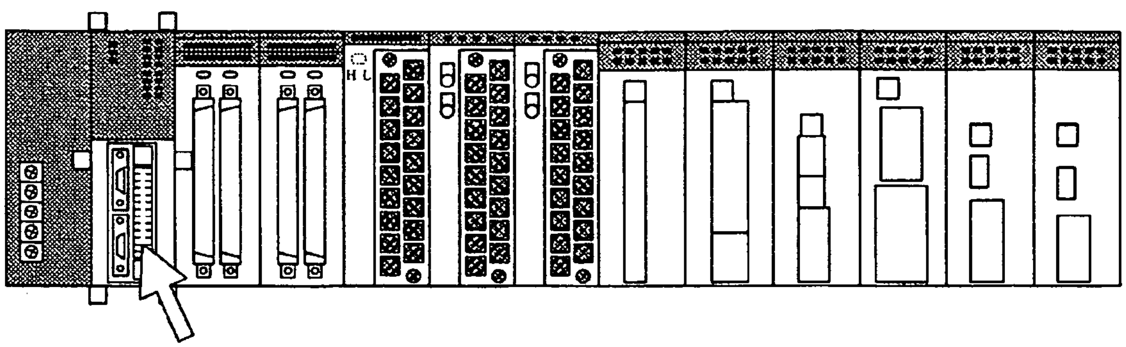
FIG. 32 shows one example of a display screen for explaining an action.
Figure 33:
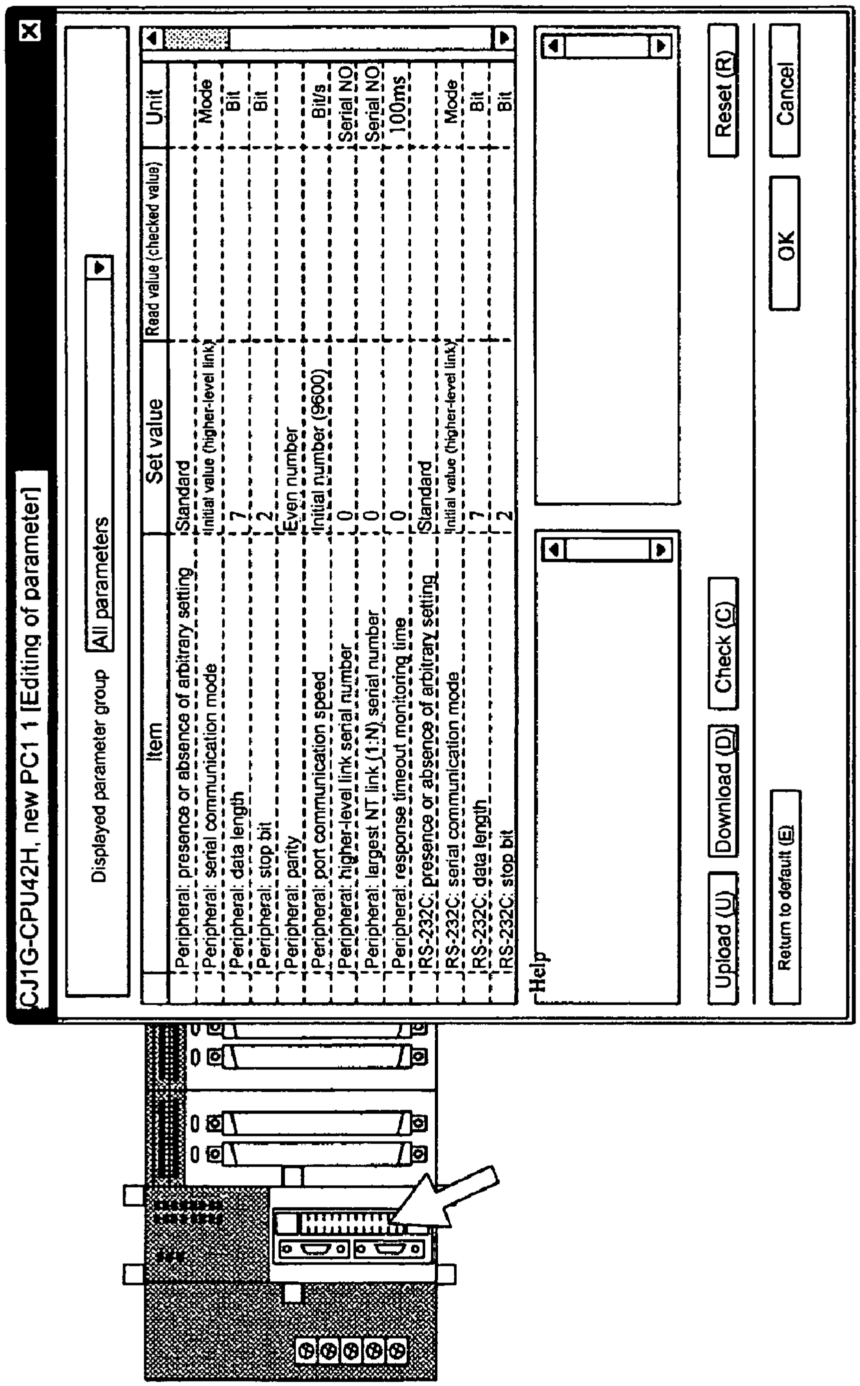
FIG. 33 shows one example of a display screen for explaining an action.

In FIG. 31, when an equipment icon of a PLC displayed in the network block diagram creation region, an equipment block diagram of the PLC is invoked to be displayed, as shown in FIG. 32. In the equipment block diagram shown in FIG. 32, when a component icon showing a prescribed unit (in the example of FIG. 32, the second unit from the left) is clicked, a special tool corresponding to the designated unit is activated, and a parameter setting screen related to the unit is automatically selected and displayed on the display screen (cf. FIG. 33). Based on this setting screen, the user can make setting of a parameter to a unit as a component.

In another example, when a component icon of a CPU unit in an equipment block diagram is clicked, a programming tool (special tool) for creation and edition of a user program to be set in the CPU unit is activated. The special tool to be activate may for example be CX-Programmer, explained in the example of FIG. 26. Similarly, when a MC unit exists in the equipment block diagram, and a component icon of the MC unit is clicked, the special tool "CX-Motion" is activated.

Figure 34:
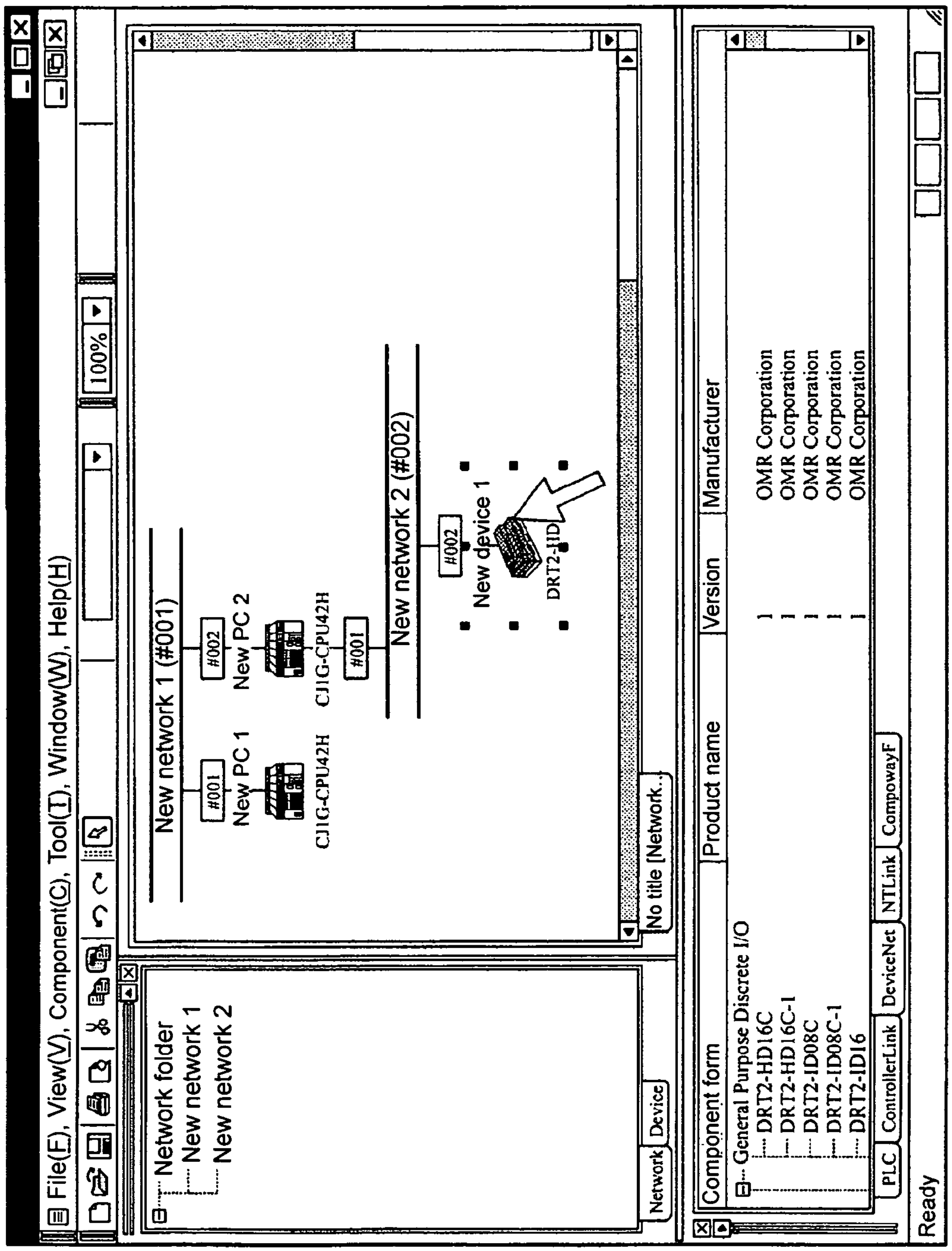
FIG. 34 shows one example of a display screen for explaining an action.
Figure 35:
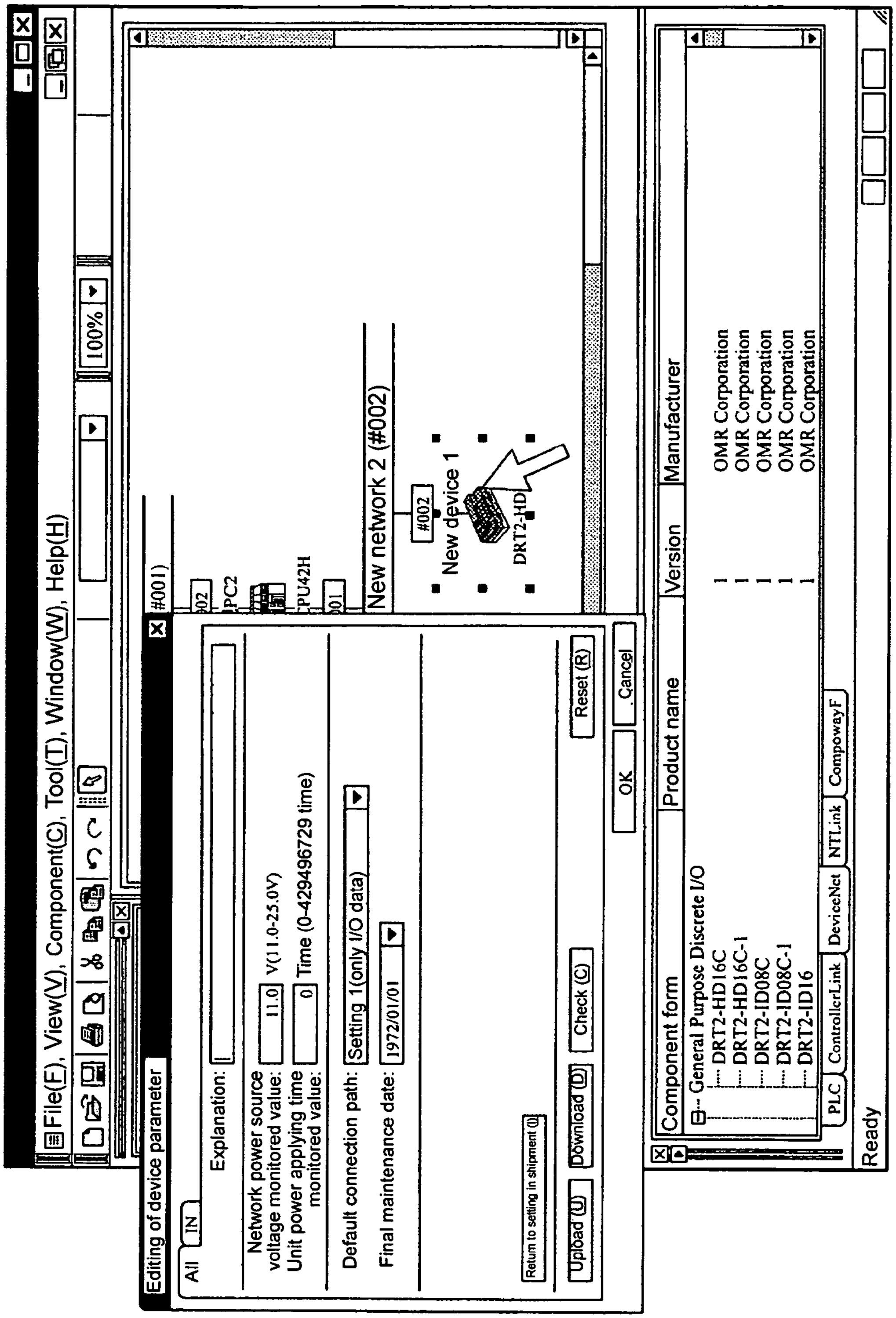
FIG. 35 shows one example of a display screen for explaining an action.

In the meantime, as shown in FIG. 34, a component icon, indicating a component other than equipment constituted of a plurality of components, such as the PLC of the network constitution creation region, is clicked, a special tool to correspond to the component is activated to select and display a screen for setting a parameter of the device (component), as shown in FIG. 35. In FIG. 35, a setting screen of a slave component connected to a device net is shown. There are other examples: when a component icon on a programmable display is clicked, NS-Designer as a special tool is activated to make it possible to make setting concerning the programmable display, create the screen of the display, and make setting of a touch panel switch. Further, when a component icon on a network monitor is clicked, a network monitor tool as a special tool is activated to make it possible to make setting of monitor equipment for monitoring a signal flowing over the network.

Figure 36:
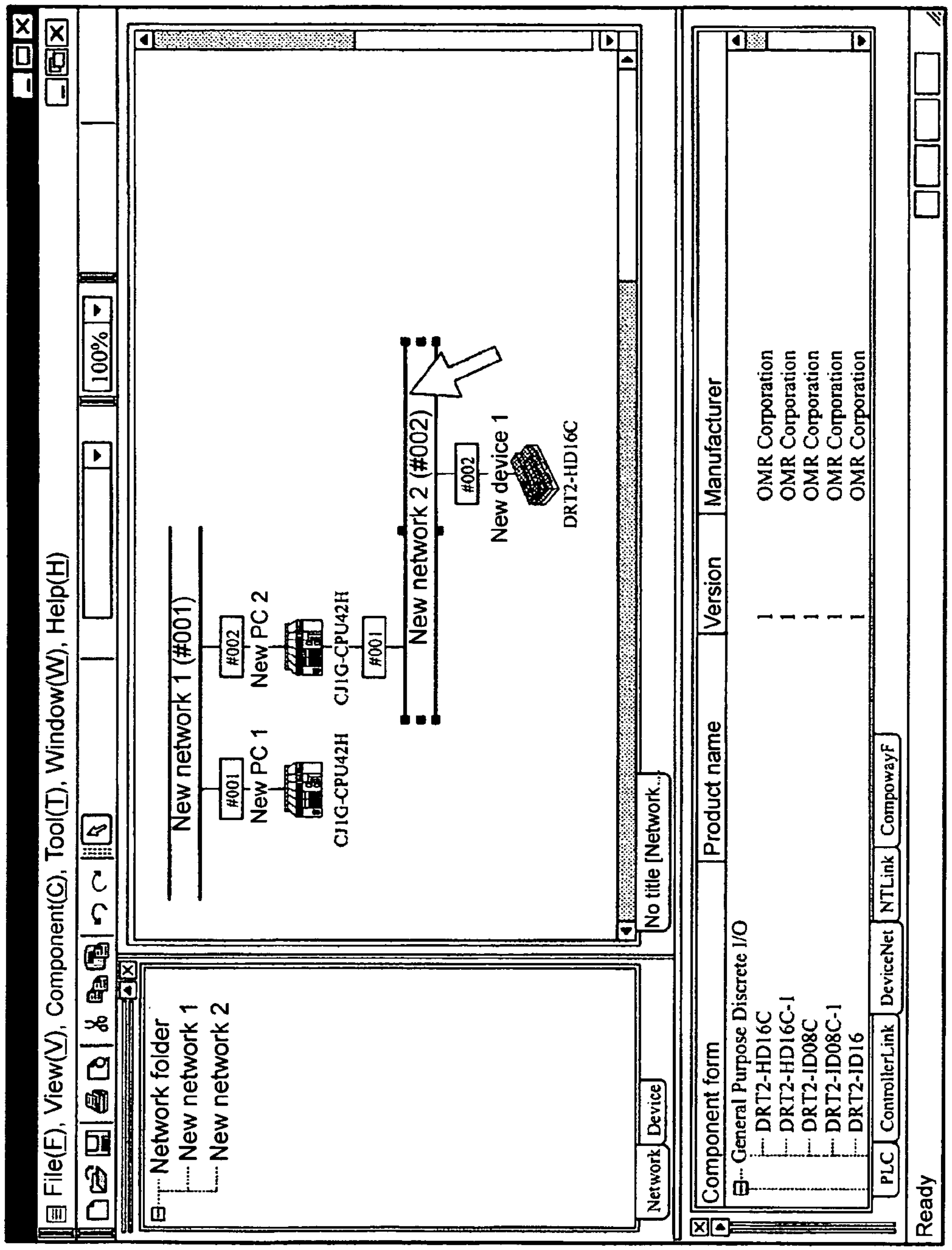
FIG. 36 shows one example of a display screen for explaining an action.
Figure 37:
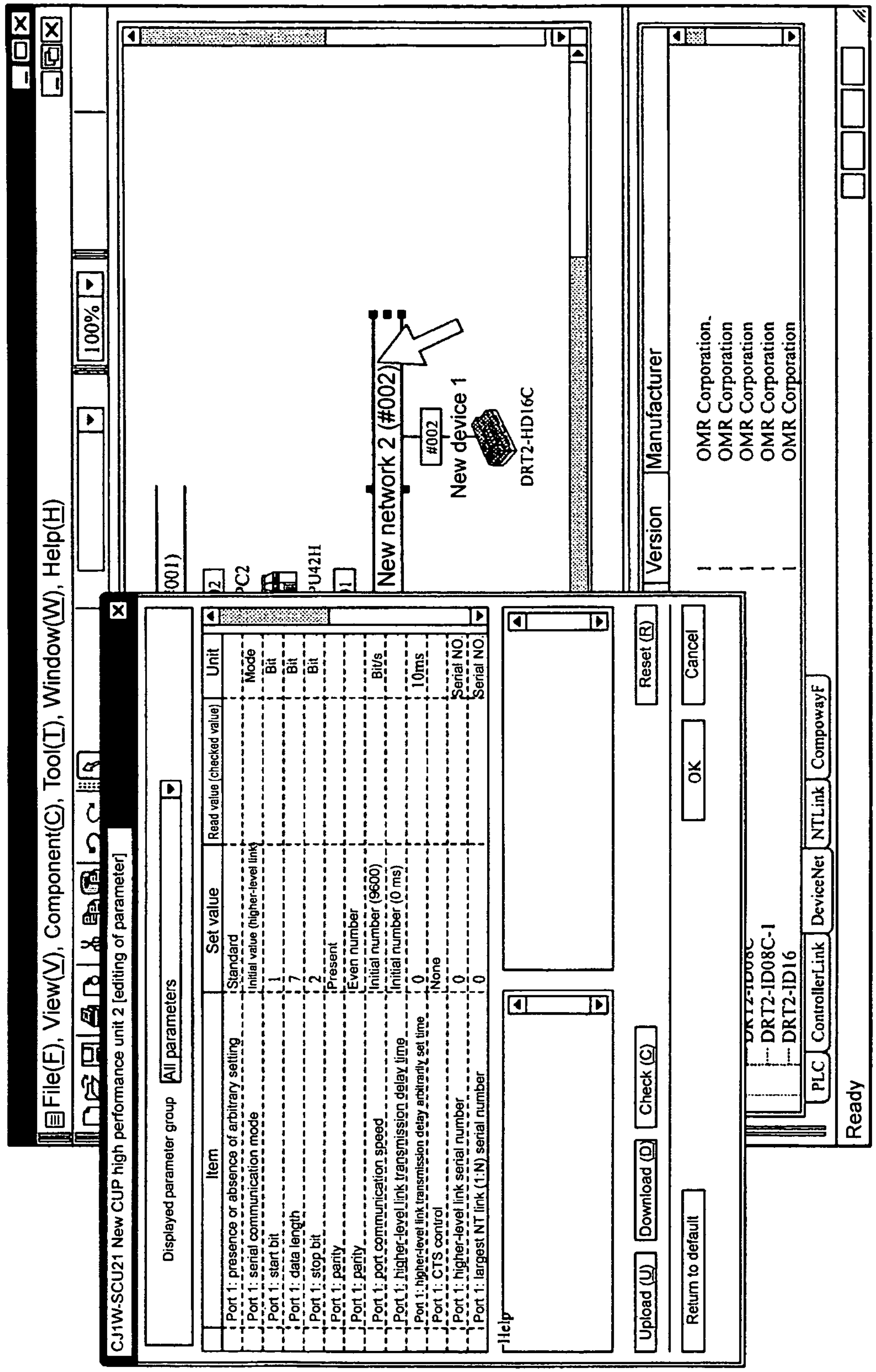
FIG. 37 shows one example of a display screen for explaining an action.

FIG. 36 is the screen on which a network icon is clicked. As shown in FIG. 36, when "New network 2" in the network block diagram creation region is clicked, a special tool for this network is activated to display a setting screen as shown in FIG. 37. As thus described, based on a component/tool management database, information (type etc.) on a component corresponding to the icon and information for specifying a setting tool are related to the icon displayed in the list display region. After transfer of the icon by the drag and drop operation into the network block diagram creation region, therefore, simply clicking the icon leads to automatic activation of the corresponding setting tool.

In the present embodiment, components connectable to equipment such as a PLC, and components connectable to a network depending on the type of network, are displayed in a list form in the list display region. Namely, each component is previously checked as to whether to be suitable for (connectable to) a network or not, and only the suitable components are displayed in the list, thereby enabling the user to select and then drag and drop requested components out of the components displayed in the list display region so as to create a network block diagram which is connected by only components connectable to the network. Obviously, it is also possible to check whether the component is connectable to the network or not at the time of dragging and dropping the component icons to be arranged on the network icons, and to allow only those components, found connectable to the network, to be used in the network block diagram.

Figure 38:
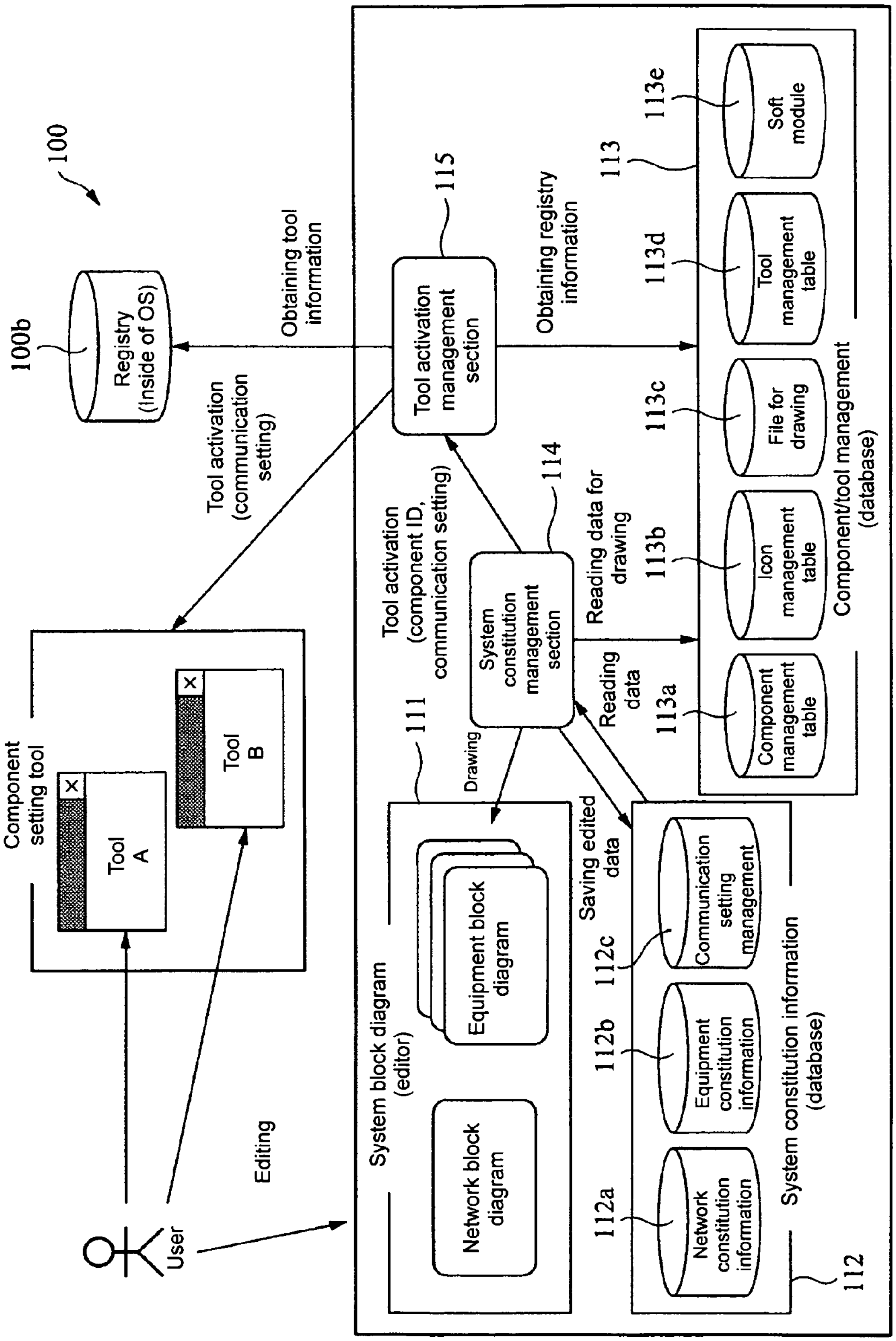
FIG. 38 shows a view showing another embodiment.

FIG. 38 shows the substantial part of another embodiment according to the present invention. This embodiment is made on the basis of the embodiment shown in FIG. 21. In FIG. 38, a network is constructed of the same components as those in FIG. 21, but mixed with components manufactured by different manufacturers from those in FIG. 21, and a setting tool is activated to make setting of a component manufactured by each manufacturer.

FIG. 38 corresponds to FIG. 21. The difference between the two drawings is that the component/tool management database 113 is provided with a software module storage section 113*e* in FIG. 38. The 113*a* has a table-structure as shown in FIGS. 39A and 39B. FIG. 39A corresponds to the table of FIG. 24, storing the same information as stored in the table of FIG. 24, and additional information: "Manufacturer" and "Component specifying equipments ID". "Manufacturer" is, as in the literature, information for specifying a manufacturer of a component, and a specific manufacturer name and the like are registered. "Component specifying equipment ID" is information for relating the component to a software module for communication with the component.

The control system setting apparatus 100 communicates with data (parameter, program, etc.) to send and receive data. When components are manufactured by different manufacturers, communication procedures thereof are also different. In view of this, the component specifying equipments table of FIG. 39B is provided so as to correspond to a plurality of communication procedures. Namely, as an application program for the control system setting apparatus 100 to communicate with a component, a software module for specifying a component is prepared to have a hierarchical structure divided into "Communication transaction soft module", "Communication message soft module" and "Communication system soft module", so as to be prepared for any kind of component.

Figure 40:
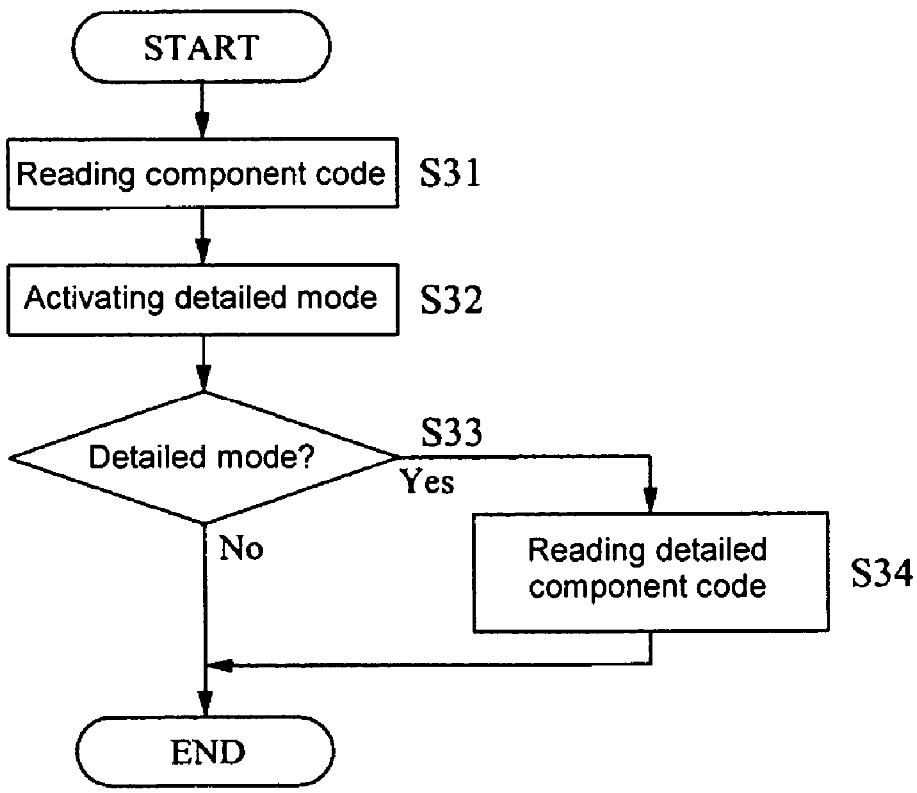
FIG. 40 shows a flowchart showing a function of a communication transaction soft module.

Herein, "Communication transaction" is a software module that executes the order of communication commands to be issued for specifying a component (communication sequence), and is also referred to as a transfer program. For example, as the flowchart shown in FIG. 40, the communication transaction is performed as follows. First, the communication transaction communicates with a component to read a code of the component (S31), and then activates a detailed mode (S32). The detailed mode is aimed at obtaining more detailed data set in the component. The communication transaction completes the processes in the absence of detailed data, whereas it executes a process of reading a detailed component code in the presence of detailed data (S33, S34).

"Communication message" is a software module that produces a telegraphic message of each communication command sent and received in each processing step to execute the communication transaction, and is also referred to as a messenger program. "Communication system" is a software module that controls communication, including processing a communication error. For example, "Communication system" handles two lower layers of an OSI communication hierarchical model.

The substances of those software modules are stored in the software module storage section 113*e*. The component specifying equipments table of FIG. 39B stores a pointer to a software stored in the software module storage section 113*e*.

Further, "Component specifying equipments ID" in the table of FIG. 39A stores a pointer to the component specifying equipment table. With this constitution, a specific tool, corresponding to a component with a certain component ID, is activated based on the setting tool ID in the table of FIG. 39A, and each kind of parameter and the like are input. When the parameters and the like are actually set to component, the special tool accesses the component specifying equipment table based on the component specifying equipment ID, and activates each software module based on the pointer to each of the three software module having been stored in the component specifying equipment table, to communicate with the component.

This will be further explained by citing a concrete example. For example, when the component ID of FIG. 39A is "001" (CS1H-CPU67H), the component specifying equipment ID is "001". It is found by reference to FIG. 39B that, when the component specifying equipment ID is "001", the communication specifying equipment is "FINS" in all of "Communication transaction", "Communication message" and "Communication system". "Software module FINS" is a software module that executes a process based on a communication regulation named "FINS". In this "FINS" software module, the component type in FIG. 39A is checked with the actual component, communicates with the component, and makes setting of the component. Further, when the component ID is "002" (CS1H-CPU66H), the same FINS software module is used to communicate with the component.

In another example, in the component ID of "003" (XXXX-XX), the component specifying equipment ID is "031". Therefore, XX_T1, XX_M1 and XX_P1 are respectively used as "Communication transaction", "Communication message" and "Communication style". In this example, since the components XXXX-XX and XXXX-YY use the same transaction for component specification and the communication system, they can also use the same software module, and only data for component specification differs between the two components. As thus described, when the software module is divided into "Communication transaction", "Communication message" and "Communication system", and those are related to each other, it is not necessary to prepare for software modules for communication in the same number as the number of kinds of corresponding components. Accordingly, it is possible to share the software modules so that the component specification can correspond to any kind of component. When those software modules are prepared using, for example, the COM technique of "MS-Windows" (registered trade name), the software modules can replace part of the functions of the entire software without compilation of the entire software.

What is claimed is:

1. A control system setting apparatus for setting a control system, which connects with the control system including a plurality of components connected by a network and comprises a computer including a processor, a storage device, an input device, a display and an interface connectable to the control system, wherein:

the computer is accessible to component profile data where a profile of a component is written;

the component profile data is prepared for each kind of components; and the storage device stores therein a setting program for causing the processor to execute a prescribed operation, the prescribed operation being performed by executing the processes of:

accepting a kind of network to be used selected by operation of the input device;

accepting a kind of component to be used selected by operation of the input device;

checking for adaptability between the network and the component based on the component profile data prior to or after the selection of the kind of component to be used by determining if an attachable network attribute value in the component profile data of the component equals a network name attribute value of the network, and giving a permission to use the component in a network block diagram representing the control system on condition that the component is adaptable to the network intended to be connected;

displaying on the display the network block diagram by the use of a figure showing the selected network as well as a figure showing the component selected and permitted to be used;

accepting an operation performed by the input device to select any one of the components included in the network block diagram;

displaying a setting screen concerning the selected component on the display;

accepting a setting operation performed by the input device in the setting screen; and sending data set concerning the component to the corresponding component through the interface.

2. The control system setting apparatus according to claim 1, wherein the setting program includes a process of displaying on the display a list of components connectable to a network based on profile data of those components in a state where the kind of network to which the component is connected is specified, and accepting an operation performed by the input device to select a component to be connected to the network out of the components in the list.

3. The control system setting apparatus according to claim 1, wherein the component profile data includes information on designation of a transfer program for processing a communication flow, and the setting program includes plural kinds of transfer programs, and a process of communicating with a component to communicate with according to the information on designation of a transfer program included in the component profile data of the component, using the designated transfer program.

4. The control system setting apparatus according to claim 1, wherein the component profile data includes information on designation of a messenger program for constituting a communication command, and the setting program includes plural kinds of messenger programs and a process of communication with a component to communicate with according to the information on designation of a messenger program included in the component profile data of the component, using the designated messenger program.

5. The control system setting apparatus according to claim 1, wherein the component profile data includes restart information to show the need for restarting after setting, and when profile data of a component to be set includes restart information, the setting program includes a process of sending a restart command to the corresponding component through the interface after sending data set concerning the component to the corresponding component.

6. The control system setting apparatus according to claim 1, wherein the component profile data includes information corresponding to a type of a component, and the setting program includes a process of obtaining information corresponding to the type of the component to communicate with from the same component to determine whether the obtained information corresponding to the type of the component is consistent with the information corresponding to the type of the component, which is included in the profile data of the component.

7. The control system setting apparatus according to claim 1, wherein the setting program includes the processes of:

displaying a network block diagram on one window;

displaying an equipment comprising a plurality of components in the network block diagram;

displaying on another window an equipment block diagram showing components included in a selected equipment, using figures showing the components, when an object selected by the operation of the input device for editing is equipment comprising a plurality of components;

accepting an operation performed by the input device to select any one of the components included in the equipment block diagram; and displaying a setting screen concerning the selected component on the display.

8. The control system setting apparatus according to claim 1, wherein the setting program includes the processes of:

receiving data registered in a component from the component through the interface;

replacing at least part of the data received with data set in the setting operation to prepare an updated setting data; and sending the updated setting data toward the component corresponding thereto through the interface.

9. The control system setting apparatus according to claim 1, wherein the component profile data is written in an extensible markup language, and included in a file provided for each kind of components.

10. A control system setting apparatus for setting a control system, which connects with the control system including a plurality of components connected by a network and comprises a computer including a processor, a storage device, an input device, a display and an interface connectable to the control system, wherein:

the computer is accessible to network profile data where the profile of the network is written as well as component profile data where a profile of a component is written;

the network profile data is prepared for each kind of networks;

the component profile data is prepared for each kind of components; and the storage device stores therein a setting program for causing the processor to execute a prescribed operation, the prescribed operation being performed by executing the processes of:

accepting a kind of network to be used selected by operation of the input device;

accepting a kind of component to be used selected by operation of the input device;

checking for adaptability between the network and the component based on at least either the network profile data or the component profile data prior to or after the selection of the kind of component to be used by determining if an attachable network attribute value in the component profile data of the component equals a network name attribute value in the network profile data of the network, and giving a permission to use the component in a network block diagram representing the control system on condition that the component is adaptable to the network intended to be connected;

displaying on the display the network block diagram by the use of a figure showing the selected network as well as a figure showing the component selected and permitted to be used;

accepting an operation performed by the input device to select any one of the components included in the network block diagram;

displaying on the display a setting screen concerning the selected component;

accepting a setting operation performed by the input device in the setting screen; and sending data set concerning the component to the corresponding component through the interface.

11. The control system setting apparatus according to claim 10, wherein the network profile data and the component profile data are written in an extensible markup language, and included in a file provided for each kind of networks and each kind of components.

12. The control system setting apparatus according to claim 10, wherein the storage device stores therein a project where data concerning one control system to be set are collected, the project comprising:

information specifying a network, concerning each network included in the control system;

information specifying a node, concerning each node of the network;

information specifying a component concerning each component connected to the network;

linking information for making the information specifying a component concerning each component connected to the network and the information specifying a node concerning each node of the network correspond to each other; and information for grouping information each specifying a component concerning a component included in one equipment, the information specifying a network and the information specifying a component including information specifying profile data corresponding to the network or the component;

the information specifying a network and the information specifying a node concerning a node of the network being made to correspond to each other;

the setting program including a process of displaying a network block diagram, using information included in the project, to access profile data corresponding to a network or a component selected by the operation of the input device.

13. A control system setting apparatus for setting a control system, which connects with the control system including a plurality of components connected by a network and comprises a computer including a processor, a storage device, an input device, a display and an interface connectable to the control system, wherein;

the storage device stores therein a setting program for causing the processor to execute a prescribed operation, a special tool as a program for setting a specific kind of network or specific kind component, and information for making each special tool and a specific kind of network or a specific kind of component, to be set by the special tool, correspond to each other, the prescribed operation being performed by executing the processes of accepting a kind of network to be used selected by operation of the input device;

accepting a kind of component to be used selected by operation of the input device;

displaying on the display a network block diagram by the use of a figure showing the selected network as well as a figure showing the selected component;

accepting an operation performed by the input device to select any one of the networks or components included in the network block diagram; and activating the special tool made to correspond to the selected network or component, wherein the computer is accessible to network profile data where a profile of a network is written as well as component profile data where a profile of a component is written, the network profile data is prepared for each kind of networks, the component profile data is prepared for each kind of components, and the setting program includes a process of checking for adaptability between the network and the component based on at least either the network profile data or the component profile data prior to or after the selection by the input device of the kind of component to be used by determining if an attachable network attribute value in the component profile data of the component equals a network name attribute value in the network profile data of the network, and giving a permission to use the component in a network block diagram representing the control system on condition that the component is adaptable to the network intended to be connected.

14. The control system setting apparatus according to claim 13, wherein the computer is accessible to component profile data where a profile of a component is written, the component profile data is prepared for each kind of components, and the setting program includes a process of checking for adaptability between the network and the component based on the component profile data prior to or after the selection by the input device of the kind of component to be used and giving a permission to use the component in a network block diagram representing the control system on condition that the component is adaptable to the network intended to be connected.

15. A non-transitory computer-readable medium including a setting program, which is installed in a computer accessible to component profile data and comprising a processor, an input device, a display, and an interface connectable to a control system, for causing the processor to perform a prescribed operation, wherein the component profile data is data where a profile of a component is written, and is prepared for each kind of components, and the prescribed operation is performed by executing the processes of:

accepting a kind of network to be used selected by operation of the input device;

accepting a kind of component to be used selected by operation of the input device;

checking for adaptability between the network and the component based on the component profile data prior to or after the selection of the kind of component to be used by determining if an attachable network attribute value in the component profile data of the component equals a network name attribute value of the network, and giving a permission to use the component in a network block diagram representing the control system on condition that the component is adaptable to the network intended to be connected;

displaying on the display the network block diagram by the use of a figure showing the selected network as well as a figure showing the component selected and permitted to be used;

accepting an operation performed by the input device to select any one of the components included in the network block diagram;

displaying on the display a setting screen concerning the selected component;

accepting a setting operation performed by the input device in the setting screen; and sending data set concerning the component to the corresponding component through the interface.

16. A non-transitory computer-readable medium including a setting program, which is installed in a computer accessible to network profile data as well as component profile data and comprising a processor, an input device, a display, and an interface connectable to a control system, for causing the processor to perform a prescribed operation, wherein the network profile data is data where a profile of a network is written, and is prepared for each kind of networks, the component profile data is data where a profile of a component is written, and prepared for each kind of components, the prescribed operation is performed by executing the processes of:

accepting a kind of network to be used selected by operation of the input device;

accepting a kind of component to be used selected by operation of the input device;

checking for adaptability between the network and the component based on at least either the network profile data or the component profile data prior to or aider the selection of the kind of component to be used by determining if an attachable network attribute value in the component profile data of the component equals a network name attribute value in the network profile data of the network, and giving a permission to use the component in a network block diagram representing the control system on condition that the component is adaptable to the network intended to be connect;

displaying on the display the network block diagram by the use of a figure showing the selected network as well as a figure showing the component selected and permitted to be used;

accepting an operation performed by the input device to select any one of the components included in the network block diagram;

displaying on the display a setting screen concerning the selected component;

accepting a setting operation performed by the input device in the setting screen; and sending data set concerning the component to the corresponding component through the interface.

17. A non-transitory computer-readable medium including a setting program, which is installed in a computer comprising a processor, a storage device, an input device, a display, for causing the processor to perform a prescribed operation, the storage device storing therein a special tool as a program for setting a specific kind of network or specific kind component, and also storing information for making the special tool and a specific kind of network or a specific kind of component, to be set by the special tool, correspond to each other, the prescribed operation being performed by executing the processes of:

accepting a kind of network to be used selected by operation of the input device;

accepting a kind of component to be used selected by operation of the input device;

displaying on the display a network block diagram by the use of a figure showing the selected network as well as a figure showing the selected component;

accepting an operation performed by the input device to select any one of the networks or components included in the network block diagram; and activating the special tool corresponding to the selected network or the selected component, wherein the computer is accessible to network profile data where a profile of a network is written as well as component profile data where a profile of a component is written, the network profile data is prepared for each kind of networks, the component profile data is prepared for each kind of components, and the setting program includes a process of checking for adaptability between the network and the component based on at least either the network profile data or the component profile data prior to or after the selection by the input device of the kind of component to be used by determining if an attachable network attribute value in the component profile data of the component equals a network name attribute value in the network profile data of the network, and giving a permission to use the component in a network block diagram representing the control system on condition that the component is adaptable to the network intended to be connected.

18. A method for setting a control system, being executed using a computer system composed of a computer, or a plurality of computers, which is accessible to component profile data and comprises an input device, a display, and an interface connectable to a control system, the component profile data being prepared for each kind of components, the method for setting a control system executing the processing steps of:

accepting a kind of network to be used selected by operation of the input device;

accepting a kind of component to be used selected by operation of the input device;

checking for adaptability between the network and the component based on the component profile data prior to or after the selection of the kind of component to be used by determining if an attachable network attribute value in the component profile data of the component equals a network name attribute value of the network, and giving a permission to use the component in a network block diagram representing the control system on condition that the component is adaptable to the network intended to be connected;

displaying on the display the network block diagram by the use of a figure showing the selected network as well as a figure showing the component selected and permitted to be used; accepting an operation performed by the input device to select any one of the components included in the network block diagram;

displaying on the display a setting screen concerning the selected component;

accepting a setting operation performed by the input device in the setting screen; and sending data set concerning the component to the corresponding component through the interface.

19. A method for setting a control system, being executed using a computer system composed of a computer, or a plurality of computers, which is accessible to network profile data and component profile data, and comprises an input device, a display, and an interface connectable to a control system, the network profile data being prepared for each kind of networks, the component profile data being prepared for each kind of components, the method for setting a control system executing the processing steps of:

accepting a kind of network to be used selected by operation of the input device;

accepting a kind of component to be used selected by operation of the input device;

checking for adaptability between the network and the component based on at least either the network profile data or the component profile data prior to or after the selection of the kind of component to be used by determining if an attachable network attribute value in the component profile data of the component equals a network name attribute value in the network profile data of the network, and giving a permission to use the component in a network block diagram representing the control system on condition that the component is adaptable to the network intended to be connected;

displaying on the display the network block diagram by the use of a figure showing the selected network as well as a figure showing the component selected and permitted to be used;

accepting an operation performed by the input device to select any one of the components included in the network block diagram;

displaying on the display a setting screen concerning the selected component;

accepting a setting operation performed by the input device in the setting screen; and sending data set concerning the component to the corresponding component through the interface.

20. A method for setting a control system, being executed using a computer system composed of a computer, or a plurality of computers, which comprises an input device, a display, and an interface connectable to a control system, makes a special tool as a program for setting a specific kind of network or specific kind component executable, and is accessible to information for making the special tool and a specific kind of network or a specific kind of component, to be set by the special tool, correspond to each other, the method for setting a control system executing the processing steps of:

accepting a kind of network to be used selected by operation of the input device;

accepting a kind of component to be used selected by operation of the input device;

displaying on the display the network block diagram by the use of a figure showing the selected network as well as figures showing the components selected;

accepting an operation performed by the input device to select any one of the networks or components included in the network block diagram; and activating a special tool made to correspond to the selected network or component, wherein the computer is accessible to network profile data where a profile of a network is written as well as component profile data where a profile of a component is written, the network profile data is prepared for each kind of networks, the component profile data is prepared for each kind of components, and the method includes a process of checking for adaptability between the network and the component based on at least either the network profile data or the component profile data prior to or after the selection by the input device of the kind of component to be used by determining if an attachable network attribute value in the component profile data of the component equals a network name attribute value in the network profile data of the network, and giving a permission to use the component in a network block diagram representing the control system on condition that the component is adaptable to the network intended to be connected.

* * * * *